(12) United States Patent
Fraser et al.

(10) Patent No.: US 7,552,084 B2
(45) Date of Patent: **\*Jun. 23, 2009**

(54) SYSTEMS AND METHODS FOR TRADING

(75) Inventors: Stuart A. Fraser, Armonk, NY (US);
Andrew C. Gilbert, Califon, NJ (US);
Philip M. Ginsberg, New York, NY
(US); Glenn D. Kirwin, Scarsdale, NY
(US); Howard W. Lutnick, New York,
NY (US); Michael E. Williams,
Morristown, NJ (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/947,285

(22) Filed: Nov. 29, 2007

(65) Prior Publication Data
US 2008/0071670 A1    Mar. 20, 2008

Related U.S. Application Data

(62) Division of application No. 09/553,423, filed on Apr. 19, 2000, now Pat. No. 7,392,214.

(60) Provisional application No. 60/131,992, filed on Apr. 30, 1999.

(51) Int. Cl.
*G06Q 40/00* (2006.01)
(52) U.S. Cl. ........................................................ 705/37
(58) Field of Classification Search ........................ None
See application file for complete search history.

(56) References Cited

U.S. PATENT DOCUMENTS

| 3,581,072 A | 5/1971 | Nymeyer |
| 4,677,552 A | 6/1987 | Sibley, Jr. |
| 4,903,201 A | 2/1990 | Wagner |
| 5,038,284 A | 8/1991 | Kramer |
| 5,077,665 A | 12/1991 | Silverman et al. |
| 5,168,446 A | 12/1992 | Wiseman |

(Continued)

FOREIGN PATENT DOCUMENTS

EP      0828223     3/1998

(Continued)

OTHER PUBLICATIONS

Munnell et al, Mar. 1996 "Mortgage Lending in Boston: Interpreting HMDA Data", The American Economic Review, vol. 86, No. 1.*

(Continued)

*Primary Examiner*—Hani Kazimi
*Assistant Examiner*—Olabode Akintola
(74) *Attorney, Agent, or Firm*—Glen R. Farbanish

(57) ABSTRACT

The present invention is systems and methods for trading. In accordance with these systems and methods, a plurality of trader work stations that are connected to a central server may be provided. Through the work stations and central server, the systems and methods may perform participant qualification, instrument creation, bid/offer entry and response, when hit and take, workup, price retention, price improvement, request for market, bid/off restoration, price generation, position conversion, marking to market, and delivery functions.

26 Claims, 32 Drawing Sheets

U.S. PATENT DOCUMENTS

| | | | |
|---|---|---|---|
| 5,243,331 A * | 9/1993 | McCausland et al. | 345/172 |
| 5,297,032 A | 3/1994 | Trojan et al. | |
| 5,347,452 A | 9/1994 | Bay, Jr. | |
| 5,640,569 A | 6/1997 | Miller et al. | |
| 5,717,989 A * | 2/1998 | Tozzoli et al. | 705/37 |
| 5,802,497 A * | 9/1998 | Manasse | 705/27 |
| 5,835,896 A | 11/1998 | Fisher et al. | |
| 5,878,139 A * | 3/1999 | Rosen | 705/75 |
| 5,905,974 A | 5/1999 | Fraser et al. | |
| 5,905,975 A | 5/1999 | Ausubel | |
| 5,924,082 A * | 7/1999 | Silverman et al. | 705/37 |
| 6,141,653 A | 10/2000 | Conklin et al. | |
| 6,199,050 B1 * | 3/2001 | Alaia et al. | 705/37 |
| 6,230,147 B1 * | 5/2001 | Alaia et al. | 705/37 |
| 6,317,727 B1 * | 11/2001 | May | 705/37 |
| 6,363,365 B1 * | 3/2002 | Kou | 705/64 |
| 6,477,513 B1 * | 11/2002 | Walker et al. | 705/76 |
| 6,519,574 B1 | 2/2003 | Wilton et al. | |
| 7,003,488 B2 | 2/2006 | Dunne et al. | |
| 7,080,033 B2 | 7/2006 | Wilton et al. | |

FOREIGN PATENT DOCUMENTS

| | | |
|---|---|---|
| EP | 1006472 | 6/2000 |
| WO | WO96/05563 | 2/1996 |
| WO | WO98/34187 | 8/1998 |
| WO | WO00/26745 | 5/2000 |

OTHER PUBLICATIONS ene Sanchez "One-Sex-Only Clubs Come Under Attack Nationwide; D.C. Antibias Law Similar to Many Others", The Washington Post (pre-1997 Fulltext). Washington, D.C.: Oct. 13, 1987. p. b.01; ISSN/ISBN: 01908286—ProQuest document ID: 73850341.*

Menzl, Vojtech, Czech Republic—Environmental Protection Equipment, National Trade Data Bank Market Reports, pp. 1-60.* eBay, eBay Inc., http://www.ebay.com (printed May 27, 2005).

Munnell, et al., Mar. 1996, "Mortgage Lending in Boston: Interpreting HMDA Data," The American Economic Review, vol. 86, No. 1.

Rene Sanchez, "One-Sex-Only Clubs Come Under Attack Nationwide; D.C. Antibias Law Similar to Many others," The Washington Post (pre-1997 Fulltext). Washington, D.C.; Oct. 13, 1987, p. b.01; ISSN/ISBN: 01908286—ProQuest document ID: 73850341.

Office Action mailed Jan. 30, 2007 for U.S. Appl. No. 10/829,119, entitled "Systems and Methods for Trading," filed Apr. 20, 2004, in the name of Stuart A. Fraser.

Menzl, Vojtech, "Czech Republic—Environmental Protection Equipment," National Trade Data Bank Market Reports, pp. 1-60 (1995).

Money Match, Functional Specification, Version 1, Aug. 1990, The Sequor Group Inc. Software Services.

Office Action mailed Apr. 22, 2003 for U.S. Appl. No. 09/553,423, entitled "Systems and Methods for Trading," filed Apr. 19, 2000, in the name of Stuart A. Fraser.

Office Action issued Oct. 17, 2003 for U.S. Appl. No. 09/553,423, entitled "Systems and Methods for Trading," filed Apr. 19, 2000, in the name of Stuart A. Fraser.

Office Action mailed Oct. 21, 2003 for U.S. Appl. No. 09/553,423, entitled "Systems and Methods for Trading," filed Apr. 19, 2000, in the name of Stuart A. Fraser.

Office Action mailed Jun. 18, 2004 for U.S. Appl. No. 09/553,423, entitled "Systems and Methods for Trading," filed Apr. 19, 2000, in the name of Stuart A. Fraser.

Office Action mailed Feb. 1, 2005 for U.S. Appl. No. 09/553,423, entitled "Systems and Methods for Trading," filed Apr. 19, 2000, in the name of Stuart A. Fraser.

Office Action mailed Nov. 3, 2005 for U.S. Appl. No. 09/553,423, entitled "Systems and Methods for Trading," filed Apr. 19, 2000, in the name of Stuart A. Fraser.

Office Action mailed May 4, 2006 for U.S. Appl. No. 09/553,423, entitled "Systems and Methods for Trading," filed Apr. 19, 2000, in the name of Stuart A. Fraser.

Office Action mailed Oct. 13, 2006 for U.S. Appl. No. 09/553,423, entitled "Systems and Methods for Trading," filed Apr. 19, 2000, in the name of Stuart A. Fraser.

Office Action mailed Jun. 22, 2007 for U.S. Appl. No. 09/553,423, entitled "Systems and Methods for Trading," filed Apr. 19, 2000, in the name of Stuart A. Fraser.

Office Action mailed Sep. 14, 2007 for U.S. Appl. No. 10/829,119, entitled "Systems and Methods for Trading," filed Apr. 20, 2004, in the name of Stuart A. Fraser.

Office Action mailed Dec. 13, 2007 for U.S. Appl. No. 10/829,119, entitled "Systems and Methods for Trading," filed Apr. 20, 2004, in the name of Stuart A. Fraser.

U.S. Appl. No. 09/553,423, filed Apr. 19, 2000, Fraser et al.
U.S. Appl. No. 10/829,119, filed Apr. 20, 2004, Fraser et al.
U.S. Appl. No. 11/947,231, filed Nov. 29, 2007, Fraser et al.
U.S. Appl. No. 11/947,347, filed Nov. 29, 2007, Fraser et al.
USPTO Notice of Allowability for U.S. Appl. No. 09/553,423, Feb. 21, 2008 (4 pages).
USPTO Office Action for U.S. Appl. No. 10/829,119, Jun. 18, 2008 (10 pages).

* cited by examiner

FIG. 17

```
                                          ┌─1700
                                          /
┌─────────────────────────────────────────────────────┐
│ $/YEN                                               │
│                ┌─1702                    ┌─1704     │
│      120.150  /    25         120.160   /    15     │
│                                                     │
│      CUST.    BID       BOT   CUST.   OFFER   SOLD  │
│─────────────────────────────────────────────────────│
│      2001     10⌣1710   0     2007    5⌣1714   0    │
│      2002(200) 15⌣1712  0     2006    10⌣1716  0    │
│                                                     │
│      TOTAL(200) 25⌣1706  0            15⌣1708   0   │
└─────────────────────────────────────────────────────┘
```

FIG. 18

```
                                            ┌─1800
          ┌─────────────────────────────────┴──────────────────────┐
1802───┤ O/N      T/N      1WK      1MO      2MO     3MO    6MO    1YR │
          │                                 ┌─1804                      │
          │ SPOT DATE 2/5    SWAP DATE 3/7 30DAYS                       │
1808───┤ 1.6210 - 15      33 - 35      15 X 10                       │
          │                                 ┌─1806                      │
          │ SPOT DATE 2/5    SWAP DATE 3/5 28DAYS                       │
1808───┤ 1.6210 - 15      30 - 32      10X25                         │
          └────────────────────────────────────────────────────────────┘
```

FIG. 19

| $/YEN | | | | | |
|---|---|---|---|---|---|
| | 121.205 | 27 | 121.220 | | 10 |
| CUST. | BID | BOT | CUST. | OFFER | SOLD |
| 1904—3001 | 5 | 0 | *3007 | 10 | 0 |
| 3002 | 1 | 0 | | | 1906 |
| 3001 | 1 | 0 | | | |
| 3003 | 20 | 0 | | | |
| TOTAL | 1902 27 | 0 | | 1908 10 | 0 |

| $/YEN | | | | | | |
|---|---|---|---|---|---|---|
| | 121.205 | 20 | | 121.220 | WTAK | 1 |
| CUST. | BID | BOT | CUST. | OFFER | | SOLD |
| 2156—3002 | 0 | 0 | 3007 | 1 | | 0 |
| 2158—3003 | 0 | 0 | | | 2106— | |
| 2152—3001 | 1 | 0 | 2154 | | | |
| TOTAL | 1 | 0 | | 1 | | 0 |

FIG. 22a

| $/YEN | | | | | |
|---|---|---|---|---|---|
| | 121.205 | 25 | | 121.220 | 45 |
| CUST. | BID | BOT | CUST. | OFFER | SOLD |
| 2202—3001 | 5 | 0 | 3007 | 25 | 0 |
| 2204—3002 | 5 | 0 | 3006 | 10 | 0 |
| 2206—3003 | 10 | 0 | 3005 | 10 | 0 |
| 2208—3001 | 5 | 0 | | | |
| TOTAL | 25 | 0 | | 45 | 0 |

| $/YEN | | | | REFNO 68119 | |
|---|---|---|---|---|---|
| 121.205 | HIT | 25 | | 121.220 | 45 |
| CUST. | BUY | BOT | CUST. | SELL | SOLD |
| [3003 | 0 | 10] | [3005 | 0 | 25] |
| 3002 | 0 | 5 | | | |
| 3001 | 0 | 10 | | | |
| TOTAL | 0 | 25 | | 0 | 25 |

FIG. 22c

| | | | | REFNO 68119 | | |
|---|---|---|---|---|---|---|
| 121.205 | HIT | 25 | | | | |
| CUST. | BUY | BOT | | CUST. | SELL | SOLD |
| [ 3003 | 15 | 10] | | [3005 | 0 | 25] |
| 3002 | 0 | 5 | | 3004 | 50 | 0 |
| 3001 | 0 | 10 | | | | |
| TOTAL | 15 | 25 | | | 50 | 25 |

```
                              ┌─ 2260
$/YEN                    REFNO 68119

121.205    HIT      40

CUST.      BUY     BOT      CUST.    SELL        SOLD
    ─────────────────────────────────────────────────────
    [3003       0      25]      3005      0           35

3002        0       5       3004     45           5
                                      2264─┘    2262─┘
    3001        0      10

TOTAL       0      40                45          40
```

| $/YEN | | | REFNO 68119 | | |
|---|---|---|---|---|---|
| | 121.205 | HIT | 7 | | |
| CUST. | BUY | BOT | CUST. | SELL | SOLD |
| 3001 | 0 | 5 —2302 | [3007 | 0 | 7] |
| 3002 | 0 | 1 —2304 | | | |
| 3003 | 0 | 1 —2306 | | | |
| [3004 121.100 | 10 | 0] | | | |
| TOTAL | 10 | 7 | | 0 | 7 |

FIG. 23b

| $/YEN | | | TZ | REFNO 68119 | |
|---|---|---|---|---|---|
| 120.100 | HIT | | 10 | | 0 |
| CUST. | BUY | BOT | CUST. | SELL | SOLD |
| [3004 | 0 | 2352  10] | [3007 | 15 | 17] |
| 3001 | 0 | 5 | | | |
| 3002 | 0 | 1 | | | |
| 3003 | 0 | 1 | | | |
| TOTAL | 0 | 17 | | 15 | 17 |

|  | CUST. | BID | BOT | CUST. | OFFER | SOLD |
|---|---|---|---|---|---|---|
| 124.20 | | 25 | | | | |
| | 2001 | 10 | 0 | 2007 | 5 | 0 — 2416 |
| | 2002 | 15 | 0 | 2006 | 10 | 0 — 2418 |
| | TOTAL | 25 | 0 | | 15 | 0 |
| 124.00 | | 20 | | 124.40 | 10 | |
| | 2005 | 20 | | 2008 | 10 | 0 — 2420 |
| | TOTAL | 20 | | | 10 | 0 |
| 123.90 | | 45 | | 124.50 | 60 | |
| | 2012 | 45 | | 2007 | 20 | — 2422 |
| | | | | 2011 | 40 | — 2424 |
| | TOTAL | 45 | | | 60 | 0 |
| [124] 45x.90 | 20x.00 | 25x.20x | | 15x | .30 10x.40 | 60x.50 |

124.20 TO  .00 HIT  76

| | CUST. | BUY | BOT | CUST. | SELL | SOLD |
|---|---|---|---|---|---|---|
| 124.30 | 2009 | WT10 | | | | |
| 124.20 | 2001 | 5 | 10 | 2008 | 14 | 76 |
| | 2002 | WT5 | 1 | | | |
| | TOTAL | | 11 | | | |
| 124.00 | 2005 | 0 | 20 | | | |
| 123.90 | 2012 | 0 | 45 | | | |
| | TOTAL | | 76 | | | |

FIG. 24C

```
┌─────────────────────────────────────────────────────────── 2470
│
│ [124] 45X00    20X.10    15X.20    10X.30    HIT
│
```

| | CUST. BID | BOT | CUST. OFFER | SOLD |
|---|---|---|---|---|
| 124.30 | 2009 | 10 | 2008 | 10 |
| | TOTAL | 10 | | 10 |
| 124.20 | 2001 | 14 | 2008 | 15 |
| | 2002 | 1 | | |
| | TOTAL | 15 | | |
| 124.00 | 2005 | 20 | 2008 | 20 |
| | TOTAL | 20 | | 20 |
| 123.90 | 2012 | 45 | 2008 | 45 |
| | TOTAL | 45 | | 45 |
| TOTAL | | 90 | | 90 |

FIG. 25a

```
| O/N | T/N | 1WK | 1MO | 2MO | 3MO | 6MO | 1YR |
|-----|-----|-----|-----|-----|-----|-----|-----|
|     |     |     | [34-30] | 3/5 | 28DAYS | | |
| [124.60-70] 2/5 | | | | | | | |
| [124.65] | | | | | | | |
```
― 2500

SYSTEMS AND METHODS FOR TRADING

CROSS REFERENCE TO RELATED APPLICATIONS

This application is a divisional of U.S. non-provisional patent application Ser. No. 09/553,423, filed Apr. 19, 2000, now U.S. Pat. No. 7,392,214, which claims the benefit of U.S. provisional Patent Application No. 60/131,992, filed Apr. 30, 1999, each of which is hereby incorporated by reference herein in its entirety.

FIELD OF THE INVENTION

The present invention relates to systems and methods for trading. More particularly, the present invention relates to systems and methods for the managed trading of select classes of assets, especially currencies and options, but also securities, financial instruments, commodities, and their derivatives in accordance with specific protocols in an auction format with controlled sequences of auction events.

BACKGROUND OF THE INVENTION

Economic activity has at its centerpiece the buyer/seller transaction for all goods and services produced and consumed in the market economy. The buyer/seller transaction is the fundamental mechanism that allocates resources to producers and output to consumers. The value of goods and services is usually expressed in a currency of denomination such as U.S. dollars. This mechanism transcends national borders. Because trade in goods and services flourishes across international borders, there is also a need to obtain foreign currency and hence create markets where currency itself is traded and is governed by the laws of supply and demand.

Throughout history, there have been many different approaches adopted to bringing buyers and sellers of goods, services, and currency together, each with the key objective of permitting transactions at or as close as possible to the "market" price of the tradable item satisfying the desires of both buyers and sellers. By definition, the market price is the price in given currency terms that a fully educated market, given full access, will transact select goods services, and currency. Discovery of the market price can only be accomplished by permitting full access to the transaction by essentially all potential buyers and sellers and by allowing expression of each party's desires. However, the buyer/seller transaction must be structured to operate at very low costs or it will distort the market price of the tradable items with artificially high transaction costs. Thus, as can be seen, the two keys to effective buyer/seller transactions—full access of expression and knowledge coupled with low transaction costs—can be and are often conflicting, necessitating trade-offs between trading efficiency and market knowledge.

Today, electronic matching and dealing systems have found successful application in many trading activities, including the buying and selling of a variety of items including goods, services, and currency. Many of these trading activities focus on the buying and selling of essentially fungible items, that is, items that are without meaningful differentiation from like items on the market. For example, a sum of currency to be deliverable on a certain date, e.g., 62,500 British Pounds Sterling at a price of 1.65 United States Dollars per 1 British Pound Sterling is indistinguishable from the same sum of currency owned by another investor on that same date.

However, these electronic matching and dealing systems have not significantly impacted the goal of satisfying the complex desires of buyers and sellers in completing a transaction as they relate to trading many tradable items, such as those in the cash and futures currency field.

OBJECTS AND SUMMARY OF THE PRESENT INVENTION

It is, therefore, an object of the present invention to provide systems and methods for implementing improved trading systems.

This and other objects of the invention are realized in a data processing system having control logic for managing select trading functions. The data processing system employs a plurality of trading workstations that are linked with a server for coordinated data flow and processing. Communication may be provided by a computer network, such as an Ethernet, a token ring, a token bus, and/or any other suitable network configuration. The system preferably includes a dedicated keypad for input from each workstation to facilitate providing individually programmed keystroke commands. Other keyboards, keypads, or voice controlled electronic devices can be used in the present system. Central processing logic dictates the available order, trading and allocation options, and screen displays for each workstation. The screen displays for each workstation can also be controlled using logic in or connected to the workstation. As orders and transactions are entered in this system, various protocols effect the allocation of bid/offer control, priority generation, exclusive trading time, and interactive trade management. As trades are completed, the system updates a linked database with the newly entered transactional data.

In accordance with a preferred embodiment of the present invention, the control logic provides a set of thirteen trading states in which any particular auction or participant may occupy. Although, thirteen states are illustrated, the present invention may be implemented with additional or fewer states in accordance with the present invention. The thirteen states are listed in Table 1.

TABLE 1

1. Participant Qualification State
2. Instrument Creation State
3. Bid/Offer State
4. When State
5. Qualified Workup State
6. Price Retention State
7. Price Improvement State
8. Request for Market State
9. Restore State
10. Price Generation State
11. Position Conversion State
12. Marking to Market State
13. Delivery State As various transactions are entered, the auction and participants occupy one of the above thirteen states. The "state" occupied determines the options available to each participant—and thus controls the flow of orders and trades in a cost-efficient and error-free manner. While participants may implement bidding, offering, and trading on differently configured workstations, the protocols are universal for all participants, thereby precluding aggressive control of transactions in the absence of true capital commitment.

Currencies have characteristics that make them especially useful for the purpose of the present invention and, therefore, are used exclusively in the following discussions with the fundamental tenet that the principles may be applied to other types of goods, services, and assets, including securities, financial instruments, commodities, and their derivatives without departing from the inventive concept of the present invention.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIGS. 17, 18, 19, 20, 21, 22a, 22b, 22c, 22d, 23a, 23b, 24a, 24b, 24c, 25a, and 25b are illustrative of trading quadrants or "QUADS" used in accordance with one embodiment of the present invention.

DETAILED DESCRIPTION OF THE INVENTION

Figure 1:
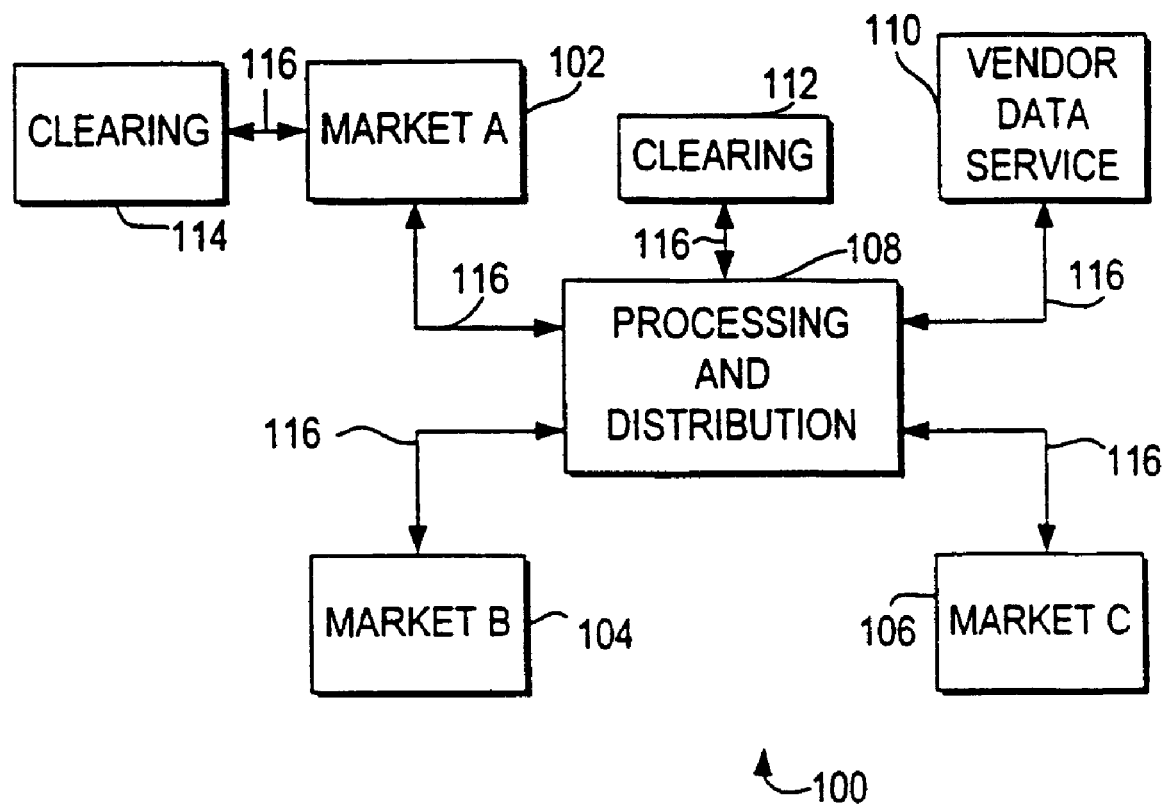
FIG. 1 is a block diagram of a trading system in accordance with one embodiment of the present invention.

The present invention is directed to systems and methods for creating trading instruments and implementing trading rules to support auctioning of the trading instruments. As illustrated in FIG. 1, the systems and methods of the present invention may be implemented as part of a trading system 100. More particularly, the present invention may be implemented in any or all of a market A 102, a market B 104, and a market C 106. A central processing and distribution system 108 may connect each of markets 102, 104, and 106 by way of communication links 116. Communication links 116 may be any suitable communication mechanism. A vendor data service 110 may also be integrated into system 100 by way of a communication link 116. Finally, clearing systems 112 and 114 may be provided to clear transactions within or between markets 102, 104, and 106.

Figure 2:
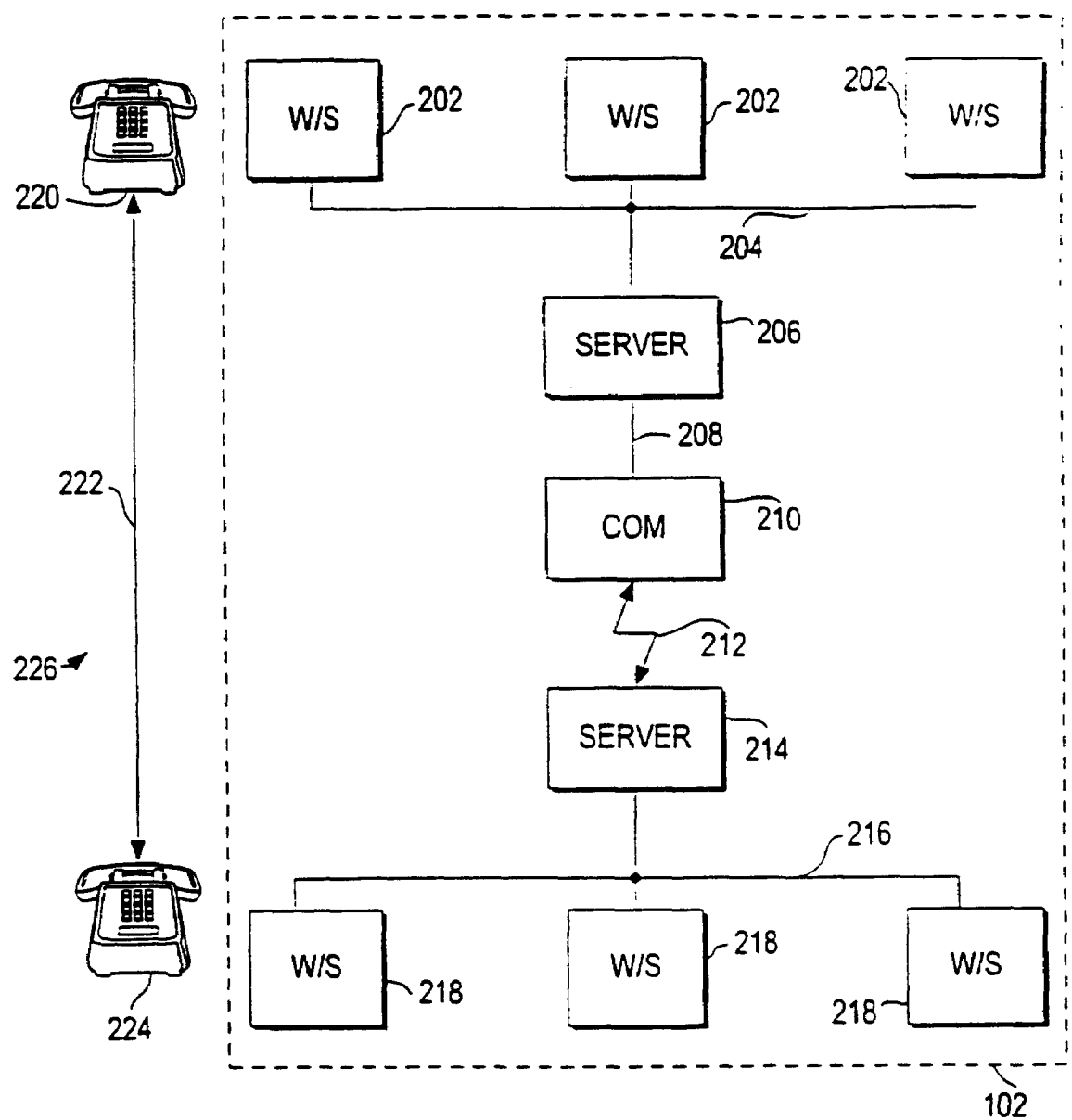
FIG. 2 is a block diagram of an auction market in accordance with one embodiment of the present invention.

As shown in FIG. 2, one embodiment of a market 102 that facilitates the auction process of the present invention is illustrated. As can be seen, market 102 may include one or more local workstations 202 and one or more remote workstations 218. Workstations 202 and 218 may be any suitable means for presenting data and, in preferred embodiments, accepting participant input. Each workstation enables a participant to engage in the auctioning process. For example, workstations 202 and 218 may be personal computers, laptop computers, mainframe computers, dumb terminals, data displays, Internet browsers, etc.

The auctioning process occurring in market 102 is preferably controlled by server 206. Server 206 may be any suitable computer or server, such as a network or Internet server. Server 206, as shown, may be connected to workstations 202 by network 204 and connected to workstations 218 by network 208, communication device 210, link 212, remote server 214, and network 216. Networks 204 and 208 may be any suitable computer network, such as the Internet. Similarly, communication device 210, link 212, remote server 214, and network 216 may be any suitable components of a computer network for enabling workstations 218 to connect to server 206, may be eliminated in part or whole, or may be supplemented by additional components. Although a specific arrangement is shown for connecting workstations 218 to server 206, any suitable configuration may be used in accordance with the present invention.

As also shown in FIG. 2, a telephone network 226 may be provided that comprises a local telephone 220 and a remote telephone 224 connected by a telephone line 222. Telephone network 226 may be used to enable participants at a remote location to communicate with participants or agents at workstations 202. This may be useful when the participants at the remote locations do not have workstations 218 at their disposal or when the participants at the remote locations have display-only workstations 218.

Figure 3:
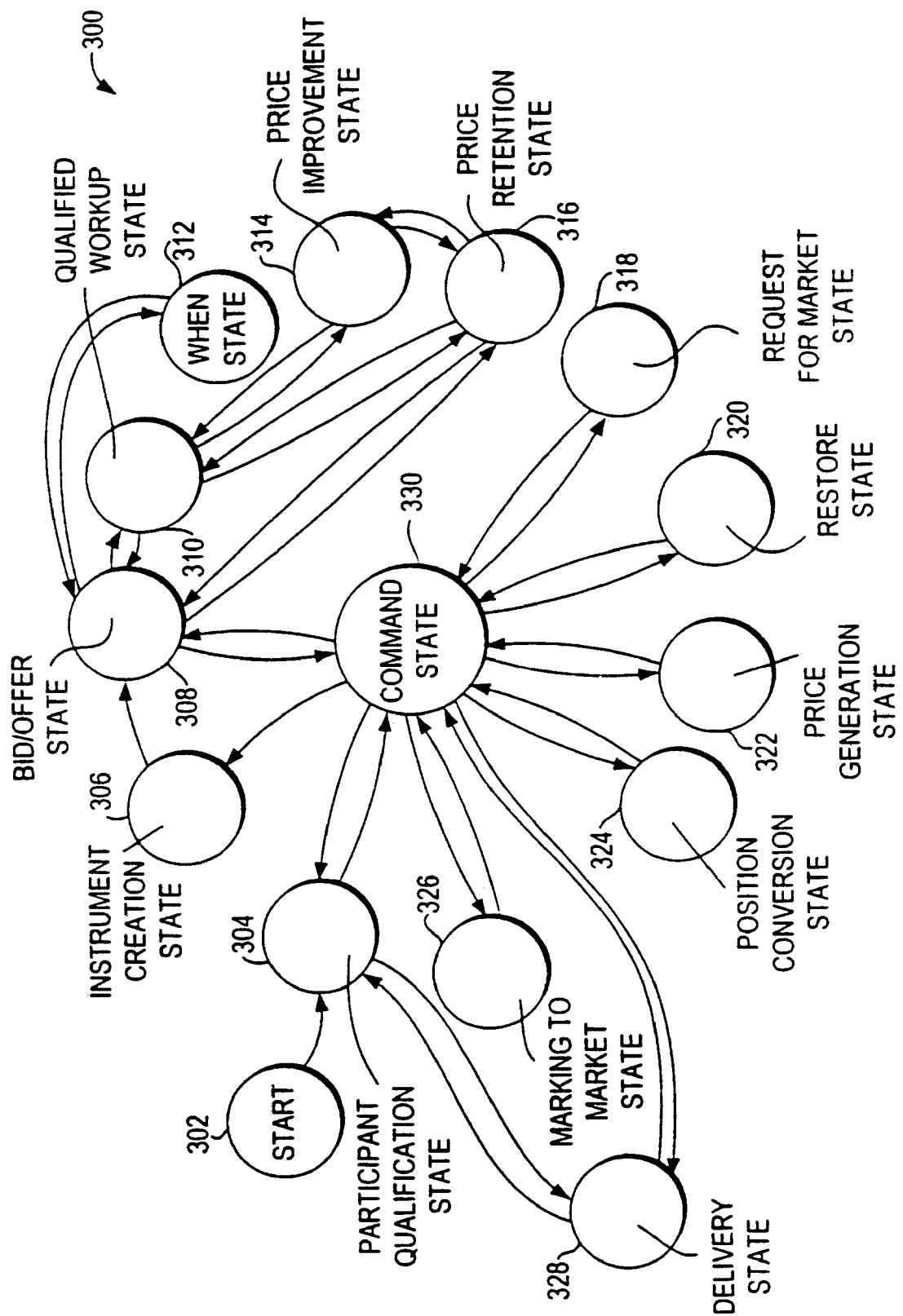
FIG. 3 is a state diagram illustrating the transitions between various states of an auction market in accordance with one embodiment of the present invention.
Figure 4:
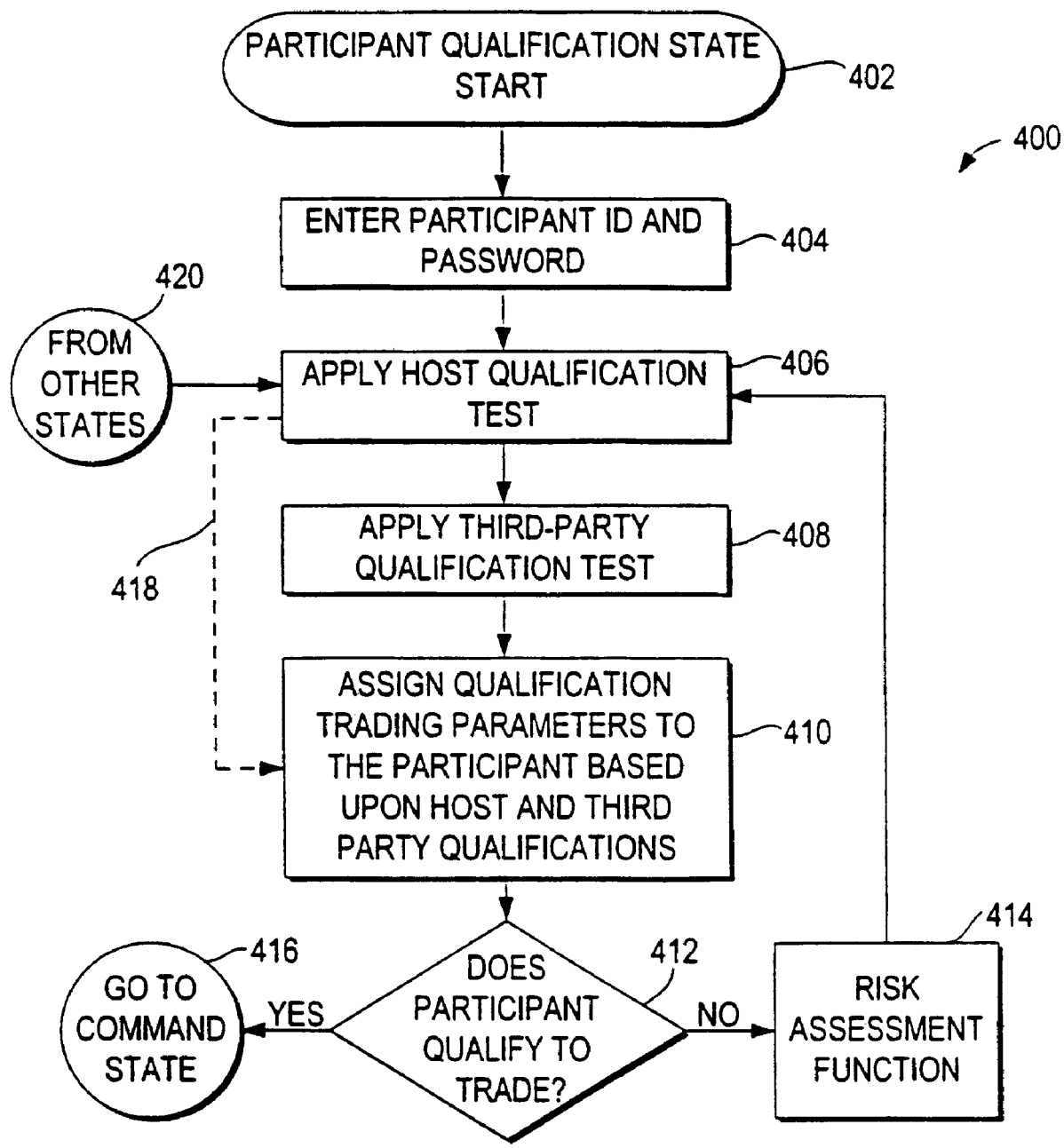
FIG. 4 is a flow diagram for a Participant Qualification State in accordance with one embodiment of the present invention.

An illustration of one embodiment of control logic 300 that may be implemented on server 206 to control the auctioning process is shown in FIG. 3. As can be seen, FIG. 3 shows a series of thirteen states 304, 306, 308, 310, 312, 314, 316, 318, 320, 322, 324, 326, and 328. Also shown is a start state 302 and a command state 330 which simply accepts participant commands and then triggers the appropriate one of the other thirteen states. Each of the thirteen states is discussed further below in connection with FIGS. 4-16. Although a particular set of states with particular transitions between the states is illustrated, the present invention may be implemented with additional, fewer, or alternative states and with additional, fewer, or alternative transitions between states.

Although the present invention is illustrated herein using states, it should be obvious to one of ordinary skill in the art that these states merely represent the ability to perform the underlying functions in each state. Accordingly, the present invention may be implemented without the use of states while still performing the functions disclosed herein.

To better appreciate the following details of the states, a review of the nomenclature employed is recommended. Some terms used throughout the detailed description are defined in Table 2. For perspective, it is worth noting that the illustrative examples which follow all focus on currencies and the trading of currencies in large volumes—with the volume of a given transaction delineated in dollars (e.g., $10 Million at a price of 124.10 Japanese Yen per U.S. Dollar).

TABLE 2

Participant - A person or controlling entity receiving and responding to trading data. While the participant is often a trader or broker acting on behalf of a customer, this is not the only arrangement. For example, a customer may interact as a participant directly. A computer may also be a participant. Still, other arrangements are also possible.
Bid - Dollar or foreign currency amount proposed to buy a currency.
Offer - Dollar or foreign currency amount proposed to sell a currency.
Spread - Difference between the best bid and the best offer in a market.
Hit - Accepting a pending bid.
Take or Lift - Accepting a pending offer.
Size - The volume in dollars or foreign currency of a particular bid, offer, hit, or take.
Makers - Participants with pending bids and offers that are making a market.
Market Makers - Participants who enter bids, offers, or bids and offers.
Trade - A string of transactions at one or more prices initiated by a hit or take and continuing until the trade is timed out or done.
Traders - After a trade is initiated, all of the participants involved in the transaction (as buyer or seller).
Aggressor - A participant who initiates a trade by hitting or lifting (or taking) a bid or offer, respectively.
Active Side - Group of traders on the same side of the market as the aggressor.
Passive Side - Group of traders on the opposite side of the market from the aggressor.
Uncleared Entry - Bids or offers that give a maker priority.
Exclusive Time - A time period commenced by a trading action during which a qualified bidder/offerer and an aggressor have the opportunity to trade more size.
Trader Surplus - Describes and quantifies the situation where an aggressor has traded the entire size shown on the passive side at one or more price levels and is showing intent to trade more. This situation leads the way to a price improvement trade between aggressor(s) and passive participants.
Price Improvement Hit - An accepted sell order at or below the current best bid to sell a currency initially for more volume than shown on the Passive Side.
Price Improvement Take - An accepted buy order at or above the current best offer to buy a currency initially for more volume than shown on the Passive Side.
Currency Swap - The exchange of one currency for another for a defined period of time.
Spot - A currency transaction that is normally valued and settled in one or two days from a trade date.
Outright - A currency transaction that settles for a date beyond the spot settlement date.

Focusing further on the nomenclature of the system logic, a "Trade" is considered a sequence of trading events, triggered by an initial hit or take that defines the aggressor, and continues for all such transactions until the trade "clears." During a non-price improvement trade, the aggressor side remains active and all transactions take place at the price set by the initial hit or take, regardless of the number of following transactions. To properly track activity, a trade preferably generates a virtual and/or a real trade ticket with an associated, screen-displayed reference number. Where a trade reflects more than a single buy or sell, multiple trade tickets that each reflect the total size transacted per participant, per side, may be recorded.

In the Bid/Offer State, participants are referred to as "makers" and "contra-makers." During other states, participants are referred to as "traders" and "contra-traders." Under this notation, traders and makers are those participants that issue a trading command, while contra-makers and contra-traders are those participants who receive a trading command. Some participants, e.g., first qualified priority buyer and/or first qualified priority seller, in the Qualified Workup State are known as "current workers" and are vested with the authority under system logic to control a trade for a predetermined duration of time.

As is explained in detail below and shown in FIGS. 17-25, information about trading progress and participants is provided to each participant at a workstation in the form of one or more selectively configured screen displays. In particular, the present invention provides for screen displays in the form of trading quadrants, or "QUADS," wherein key trading indicators are displayed.

In FIG. 17, a QUAD 1700 for a Bid/Offer State is shown. As illustrated, the current bid is indicated in field 1702 as 120.150 Yen per Dollar for $25 million. The current offer is indicated in field 1704 as 120.160 Yen per Dollar for $15 million. The difference between the bid and offer indicates a spread of 0.01 (or 1 pip). When a trade is in progress, as initiated by a hit or take from the Bid/Offer State, the participant's attention is mainly directed to the conditional prompts 1706 and 1708 showing the total sizes that are being bid and offered and that can be acted upon by the participants. These numbers are displayed at the intersection of the totals line and the Bid/Offer columns as 25 and 15, respectively. This total is further defined in the QUAD into individual pre-quantities 1710, 1712, 1714, and 1716, indicating the participants' sizes in their respective rows.

Participant Qualification State

Given the risks inherent in the buying, selling, and settlement of currency instruments, participants desire the ability to control access to their markets. The Participant Qualification State 304 (FIG. 3) in the present invention allows participants, or subsets of participants, to set parameters that bound and confine the ability of another participant to place bids and offers, and to execute buy and sell commands with respect to those participants or subsets of participants. One embodiment of this state is illustrated as process 400 in FIG. 4.

As shown, once a participant has accessed a market and thereby initiated process 400 at step 402, the participant is directed to enter a participant id. and password at step 404. Upon determining the identity of the participant at step 404, process 400 then applies a host qualification test at step 406. The host qualification test may be any suitable method for determining whether a party is qualified to participate by the host of system 100. Once this test has been performed, process 400 proceeds to perform a third-party qualification test at step 408. Similarly, the third-party qualification test may be any suitable method for determining whether a party is qualified to participate by an existing participant in system 100. Alternatively, step 408 can be bypassed when the host qualification test is passed or for any other reason by taking path 418.

Through the tests performed at steps 406 and 408, each participant may obtain one or more quantifiable class rankings that provide credit limits for that participant. These limits allow for dynamic allocation of potential bids or offers and hits or takes to the participants based upon the dynamic limits of each participant.

For example, Participant CUST 2001 may be BANK A, which has an approved large credit line for the trading of cash U.S. Government Securities and their related futures. Using criteria embedded in these tests and information provided by BANK A, e.g., equity capital, assets and liabilities, etc., process 400 may provide a ranking of credit worthiness, e.g., for BANK A, New York a ranking of "100." Alternatively, other rankings are also possible, e.g., "A1," "AAA," or "100, A, 90, B." In this latter example, 100 may represent a credit ranking for currency swaps for BANK A with respect to another participant and 90 may represent the lowest credit acceptable as a counter party with that other participant for a currency swap transaction. As another example, a ranking of 90 may correspond to participants who have the ability to only bid or offer $100 million of spot currency.

Upon completing or bypassing the third-party qualification test of step 408, process 400 may then assign qualification trading parameters to the participant based upon host and third-party qualifications at step 410.

In preferred embodiments of the present invention, the assignment of these trading parameters includes transitively linking participants. Transitive linking in the present invention enables a first participant who is qualified to trade with a second participant to also trade with a third participant if that second participant is qualified to trade with the third participant. This may be accomplished by creating, for every combination of possible bidders, offerers, buyers, and sellers, a sequence or set of bilateral counter party size limits that are assigned by currency instrument. For example, if, for a particular instrument, Participant CUST 2001 qualifies to trade with Participant CUST 2003, and if, for that same instrument, Participant CUST 2002 qualifies to trade with Participant CUST 2001, then through the transitive linking algorithm of step 410, Participant CUST 2002 may be granted the right to trade with Participant CUST 2003.

Once the trading parameters have been assigned at step 410, process 400 then determines whether the participant qualifies to trade at step 412. If the participant does not qualify, then a risk assessment function is performed at step 414 and process 400 loops back to step 406. Otherwise, process 400 transitions to the command state at step 416.

The qualifying of any participant, or group of participants, may be performed only once when the participant first enters market 102 or dynamically as trading progresses (as shown by step 420, for example). Similarly, limits that are used to determine a participant's, or a group of participants, ranking may be set dynamically. In the ranking process, a metric or a set of metrics may be used to monitor a participant's or a group of participants' activity. More particularly, this metric may take into account factors such as the number of trades made by the participant(s), the amount of trades made by the participant(s), the volatility of the market, the price range of the market, the volume of the market, etc. By combining together these factors in the metric, for example, the present invention provides participants with controls that enable them to mitigate market counter party risk and enhance the integrity of the market.

Instrument Creation State

Trading in foreign exchange highlights the need for special attention to value date identification. A value date in trading of currency is the date on which the funds in the trade are actually exchanged. For example, in a spot transaction, the value date is typically two days. This means that a trade of U.S. Dollars for Japanese Yen is actually performed two days from the trade date. Value date problems can arise for several reasons such as different national holidays, different clearing mechanisms, and requirements to confirm trades in writing. Because of these problems, it is necessary to use conventions for value dating.

For example, spot currency value dates for dealings in foreign currencies in exchange for U.S. Dollars are usually two business days from the transaction date, provided that those days are also business days in New York. If there is a holiday in either the country of the foreign currency or in New York, the value date is moved forward until there is a business day in both the foreign country and New York. If, however, one deals in Canadian Dollars, the "spot date" is taken to be one rather than two business days forward.

The same conventions are also applied in the case of outright, forward value dates in foreign exchange. For example, a 2-month forward transaction will not have a value date 60 days ahead of the transaction date when that date is not a business day in both the foreign country and New York. Normally, as with spot transactions, this problem is overcome by moving the value date forward. If moving forward the value date would change the month of the contract, however, then the value date is moved backward to allow fixing of a value date for settlement. For example, a 2-month trade made on Dec. 4, 1998 (with a spot value date of December 8), has a value date of February 8 which is 62 days from the spot value date.

When trading foreign exchange, it is important to know the exact dates of settlement as prices are quoted to reflect the time period between value dates. Currency futures contracts usually have single delivery dates, however, and hence mismatched value dates from holding hedged positions in the cash and futures markets is the norm.

Thus, it is apparent that the time between a trade date and the corresponding value date for any particular type of transaction may not be a fixed duration from one trade date to the next, and may also have an unequal duration when the same type of transaction for the same trade date is applied to different currency pairs. In order to rectify the mismatch and to increase the efficiency of the cash and futures market as a hedging vehicle, the present invention controls the creation of value dates for trading. The system interprets each nation's banking holidays to properly identify the correct value date when quoting currency prices for each trading day by country of origin. For example, if there were a national holiday in Japan on May 1, then spot trading on April 30 would still have a single value date for the Japanese Yen and the U.S. dollar, i.e., May 3 for the Yen and May 3 for the U.S. dollar.

Figure 5:
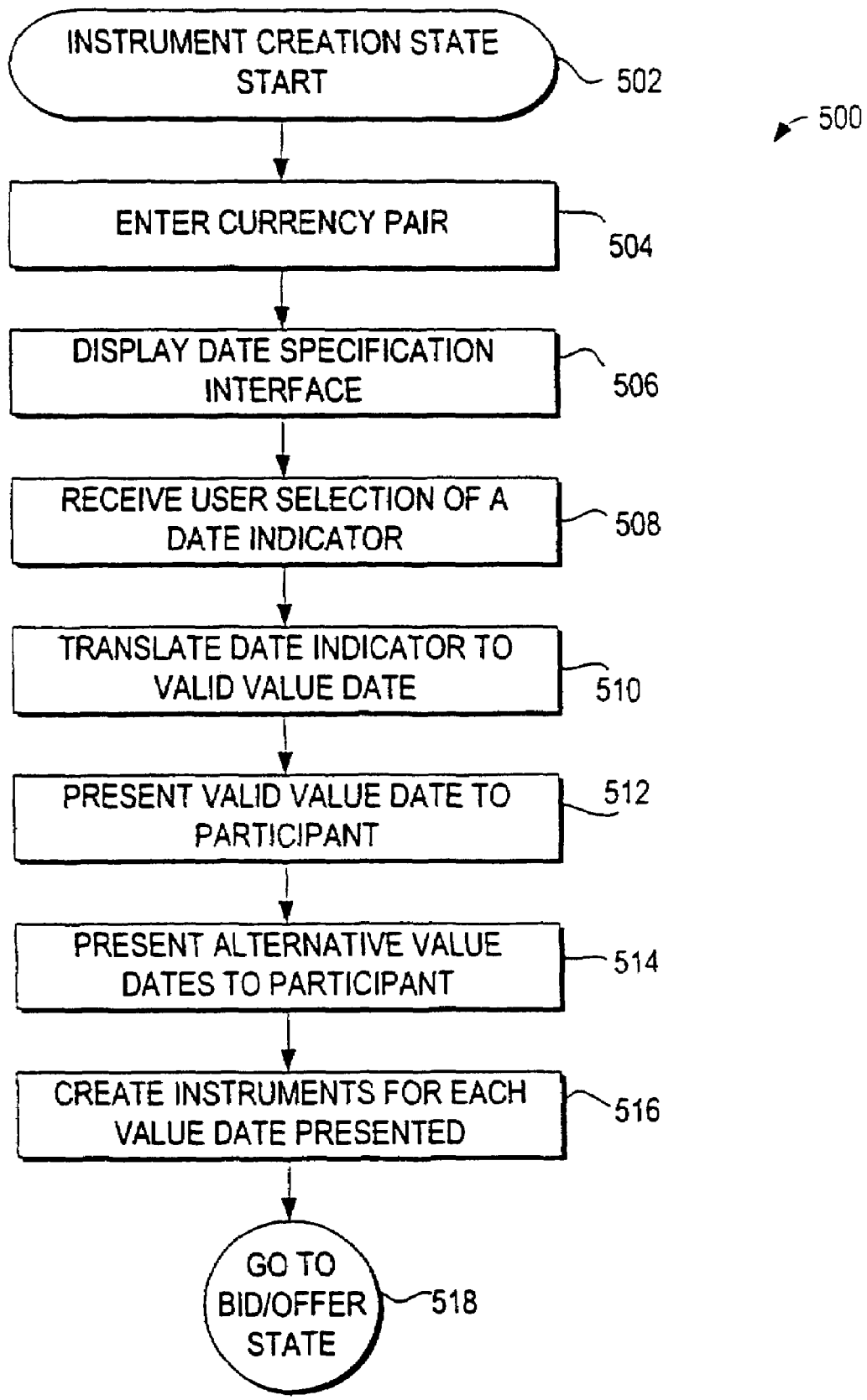
FIG. 5 is a flow diagram for an Instrument Creation State in accordance with one embodiment of the present invention.

One embodiment of the Instrument Creation State 306 of the present invention is illustrated in FIG. 5 as process 500. As shown, process 500 begins at step 502. Subsequently, at step 504, the participant is required to enter a currency pair. Then at step 506, process 500 displays a date specification interface. This interface may be a simple date entry field, a display of a calendar (or a series of calendars), a display of a series of options, or any other suitable interface. For example, one illustration of a date specification interface is shown in QUAD 1800 of FIG. 18.

Following the display of the date specification interface, process 500 receives a user selection of a date indicator at step 508. For example, using the interface illustrated in QUAD 1800, a participant may activate any date cell 1802 through an input device. Upon activating a date cell, the date indicators 1804 are automatically translated to a valid value date at step 510. The valid value date is then presented on the screen at step 512. The present invention may then also present alternative value dates 1806 to the participant at step 514. Finally, process 500 creates an instrument 1808 on the screen for each of the value dates displayed at step 516, and transitions to the Bid/Offer State at step 518.

For example, as shown in QUAD 1800, by selecting "1MO," two instruments for a one-month swap are displayed. Each instrument shows the price differential for an exchange for settlement in two days and the price differential for an exchange for settlement at a future calendar date. The top instrument shows a future calendar date of March 7, and the bottom instrument shows a future calendar date of March 5.

In addition to allowing a participant to enter a currency pair and date selection, the instrument creation state may allow the participant to designate any characteristics of an instrument or commodity to be traded. For example, using drop-down menus, a participant could select an option type (e.g., American or European), kind (e.g., call, put, straddle, or strangle), delta (e.g., 25, 15, or 5), and reference currency (e.g., Euros, Dollars, or Yen). Once the instrument is specified, the present invention may then make the instrument available for trading in the Bid/Offer State.

Thus, it should be apparent that the instrument creation state of the present invention is especially convenient for the trading of currencies, and thereby improves the complementary nature of the cash and the futures markets, and provides a more efficient hedging market.

Bid/Offer State

Once the Instrument Creation State generates a currency instrument, preferred embodiments of the present invention enable bids and offers to be placed for the instrument through a Bid/Offer State. In this state, a participant can establish trading priority by placing a bid or offer at a select price and volume. Bids and offers for an instrument are preferably displayed on the workstations such that all of the best bids at the same price are displayed together, in order, based upon the time the bids were made, and such that all of the best offers at the same price are displayed together in order based upon the time at which the offers were made. As the best bids and offers are hit and taken, respectively, the next-best bids and offers are similarly displayed. Although the best bids and best offers are preferably initially arranged in the display based upon time of placement, the bids and offers may be initially arranged, or may be rearranged, based upon a size parameter or any other suitable parameter.

Importantly, both bids and offers are commitments once placed. A bid can be "hit" and an offer can be "taken" or "lifted" by another participant willing to trade the currency at the set price once the bid or offer has been made. Once a bid or offer is hit or taken, respectively, the bidder or offerer is obligated to trade the corresponding currency. To maintain stability in the market, the present invention may control each participant's command size in order to prevent a participant from making order transmittals that are outside of the participants' permissible trading parameters as determined by the participant Qualification State. The present invention may also alert management to participants that are approaching credit boundaries that have been established and updated in the Participant Qualification State.

The participant hitting a bid or taking an offer may or may not have an offer or bid, respectively, showing at the time of hitting or taking. In certain embodiments of the present invention incorporating a When State, a bid or offer may only be available to, or only seen by, certain participants currently having outstanding bids or offers for a given time interval. This bid or offer is referred to as being "uncleared." After the given time interval has run, however, any remaining uncleared bids or offers become available to all participants. For certain currencies, the given time interval may be zero. By allowing these certain participants the first view of new entries, these participants are rewarded for showing the market on their side. Thus, the initial bidders/offerers are invited to become aggressors and the given time interval provides these bidders/offerers time to make their decision by delaying the entry into the market of new buyers and sellers.

A second type of priority is also granted if a bid/offer qualifies with regard to a minimum size definition. Bids and offers that are at least as large as a system determined limit allow participant priority rights to enter the Qualified Workup State. This is important to prevent some participants from holding up the trading desires of other participants, especially in fast moving or volatile markets.

To control trading between many participants, a hierarchy of trading participants is set. A participant who hits a bid or lifts an offer is designated as an "aggressor." The aggressor's side of the trade is defined as the active side of the trade and the other side of the trade is defined as the passive side of the trade. For example, if the participant hits a bid, then selling becomes the active side of the trade and buying becomes the passive side of the trade. If the participant takes an offer, on the other hand, then buying becomes the active side of the trade and selling becomes the passive side of the trade.

Which side is the active side has an important practical consideration because, under some conventions, the active side is required to pay commissions on the ensuing transactions. When a Price-Improvement trade (as explained below) takes place, however, the commission on this trade may be divided among the participants in the trade. This allocation of commissions is premised on the notion that the active participants are taking advantage of liquidity while the passive side is supplying liquidity to the market, and on the notion that if a better price can be obtained during Price-Improvement trading, a passive trader is provided with value that the passive trader should be willing to pay for. Further arrangements for commission allocation to encourage trading are possible, e.g., choices among volume discounts, annual fixed fees, both sides pay, and paying based on time and place of execution.

In preferred embodiments of the invention, when placing bids and offers, two size components may be entered. The first is the size to be shown or revealed to the market and the second is the size to be hidden or non-revealed to the market. The present invention may also be implemented such that no hidden component may be entered. Although not displayed, the hidden or non-revealed size may be used for trading and provides a buying or selling priority to the bidder or offerer. For example, a customer may post a hidden bid for $200 million versus Yen, but only show $50 million of that bid. In this way, the customer only needs to disclose to potential sellers a desire to buy $50 million, when in fact the customer would like to buy $200 million. This prevents the sellers from altering their price based upon the known intentions of the customer. When a bid or offer with a hidden size portion is hit or lifted, the bid or offer remains in the bid/offer queue until done. Alternatively or additionally, rather than preventing other participants from knowing about the hidden portion of a bid or offer, the hidden portion could be reflected in the total bid or offered size that is displayed at the conditional prompt.

To prevent participants from simply using multiple shown bids or offers, each for a portion of their total intended bid or offer, the present invention preferably prevents participants from getting the priority benefit of an earlier bid or offer for subsequent bids or offers. For example, in the example above, if the customer were to place four shown bids for $50 million, the second, third, and fourth bids would not be entitled to the time priority of the first, and thus would be subject to the priority of intervening bidders.

In some embodiments of the present invention, hidden hits and/or takes (or lifts) may be permitted. In these embodiments, a potential aggressor may be able to designate to hit or take the next bid or offer at a given size and/or price. Entry of the this hit or take is preferably not known to other participants. Such hidden hits/takes may be given time, price, size, and/or any other suitable priority. For example, the first hidden hit/take that is entered may be given priority, or the best price hit/take may be given priority. Hidden hits/takes may be implemented so as to have a participant-designated duration or may expire based upon a system defined parameter, or any other suitable parameter.

System logic also controls the execution of "all-or-none" bids and offers, and hits and takes. In its simplest form, an all-or-none order is an order that can only be executed if the full size of the order can be met, e.g., a bid by a participant to buy $100 million at an exchange rate of 124.00 Yen/$ is filled when another participant agrees to sell $100 million at an exchange rate of 124.00 Yen/$.

To accommodate the needs of participants and extend the order placement and execution capabilities, the system may control "partial" executions to allow a buildup or bunching of executions. By defining a time interval, all-or-none orders can be filled through one or more-than-one passive trader responding to an all-or-none hit or take. For example, a request to sell $100 million as an all-or-none order moves the requestor into an aggressor and triggers the time interval in which passive traders can respond. If within the time interval's expiration there exist $100 million of bids from either one or more bidders, then the trade is executed and cleared. The time interval is controlled by system parameters and can be as long as a good till cancel order or a day order.

In certain embodiments of the present invention, the system or a participant may designate that a bid or offer can only be hit or taken in at least a certain minimum size. This feature may be provided in order to prevent the bid or offer from being repeatedly hit or taken in very small increments. For example, with a bid or offer of a $100 million in size, a participant may require that the minimum hit or take size be $25 million. This would prevent another participant from hitting or taking at $10 million increments. Although the minimum may be set by the bidder or offerer, the minimum could additionally or alternatively also be set by the system host or another participant.

Figure 6:
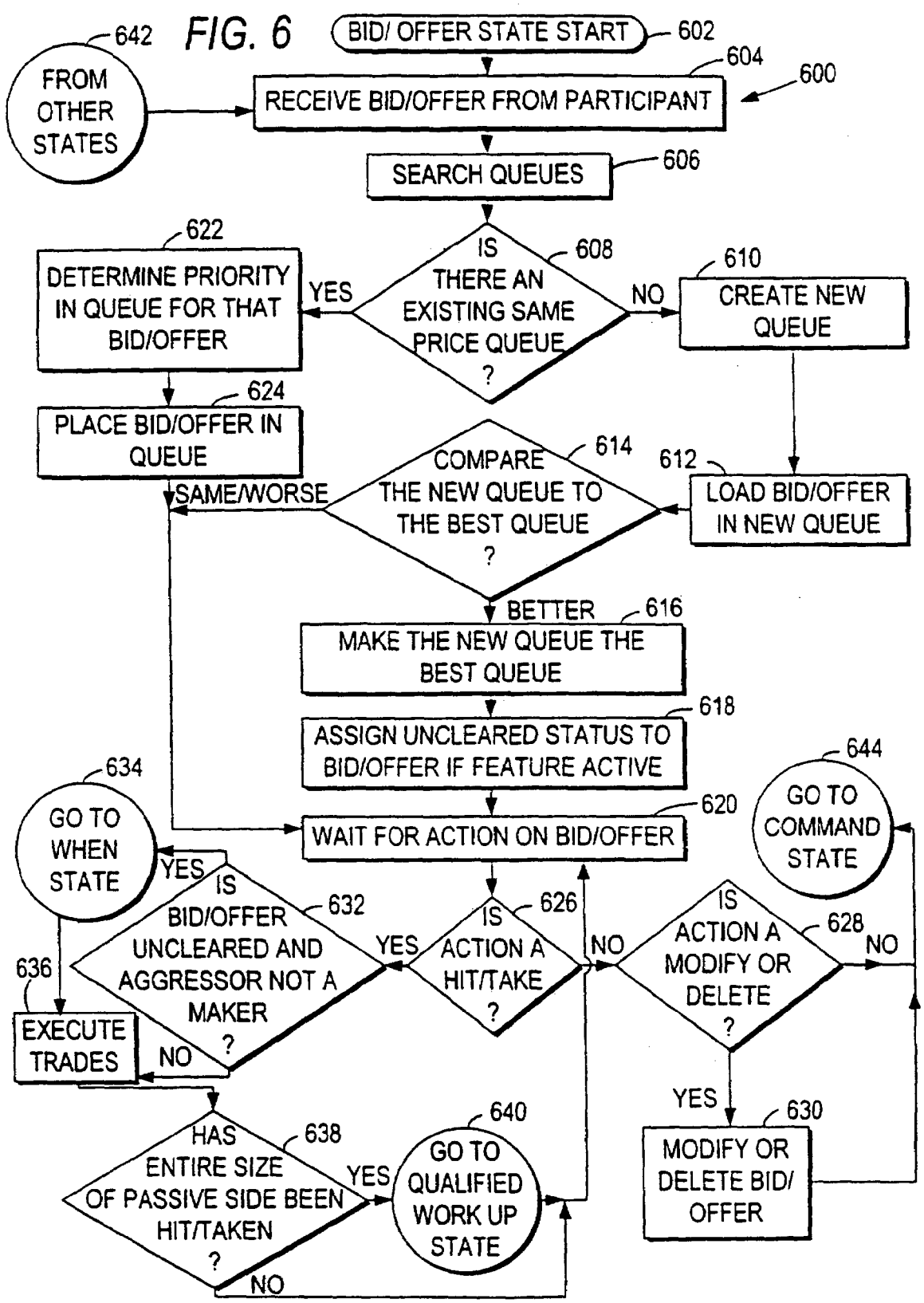
FIG. 6 is a flow diagram for a Bid/Offer State in accordance with one embodiment of the present invention.

One embodiment of a Bid/Offer State process 600 is illustrated in FIG. 6. As shown, process 600 begins at step 602. Next, process 600 receives a bid/offer from a participant at step 604. Using this bid/offer, process 600 then searches the existing bid/offer queues for a same price queue at step 606. At step 608, the process then determines if a same price queue was found. If a same price queue was found, then process 600 determines the priority in the same price queue for this bid/offer at step 622. This determination may be based upon the time of making the bid/offer, the size of the bid/offer, or upon any other factor or combination of factors. Next, at step 624, the bid/offer is placed in the found queue.

If an existing same price queue is not found at step 608, then a new queue is created at step 610. Once the queue has been created, the bid/offer is loaded in the new queue at step 612. The new queue is then compared to the best queue to determine which is better at step 614. This determination is typically based upon price such that a bid queue is better than another if the price is higher and an offer queue is better than another if the price is lower. If the new queue is determined to be better than the best queue at step 614, process 600 then makes the new queue the best queue at step 616 and assigns uncleared entry status to the bid/offer, if the feature is active, at step 618.

After assigning uncleared entry status at step 618, if active, after determining that the new queue is not better than the best queue at step 614, or after placing the bid/offer in an existing queue at step 624, process 600 then waits for an action on the bid/offer at step 620. Once an action on the bid/offer has occurred, process 600 proceeds to step 626 to determine if the action was a hit or take. If the action was not a hit or take, process 600 determines if the action was a modification or deletion of the bid/offer at step 628. If there was a modification or deletion of the bid/offer, the bid/offer is modified or deleted at step 630. If there is no modification or deletion of the bid/offer or after the bid/offer has been modified or deleted, process 600 transitions to the command state at step 644.

If it is determined at step 626, however, that the action was a hit or take, process 600 then proceeds to step 632 to determine if the bid/offer is uncleared and the aggressor is not a maker. If it is determined at step 632 that the bid/offer is uncleared and the aggressor is not a maker, then process 600 temporarily transitions to the When State at step 634. Once the When State has completed and retransitioned to process 600 at step 634, or if it is determined at step 632 that the bid/offer is not uncleared or the aggressor is a maker, process 600 executes the trades defined by the bids/offers and hits/takes at step 636. Next process 600 determines whether the entire size of the passive side has been hit/taken at step 638. If it is determined at step 638 that the entire size of the passive side has been hit/taken, process 600 then temporarily transitions to the Qualified Workup State at step 640. Once the Qualified Workup State has completed and retransitioned to process 600 at step 640, or if it is determined at step 638 that the entire size of the passive side has not been hit/taken, process 600 loops back to step 620 to wait for another action on the bid/offer.

The screen display will change according to the various entries into the bidding process. In QUAD 1900 depicted in FIG. 19, participants 3001-3003 on the bid side reflect a market of $27 million, as shown by the conditional prompt 1902 in the bid column. This market includes a first bid 1904 by participant CUST 3001 of $5 million. In this example, participant CUST 3007 has entered an uncleared offer 1906 of $10 million (asterisk indicates the offer is uncleared). This $10 million is also indicated in conditional prompt 1908 in the offer column. As explained above, the present invention may give the original makers a first chance to review the new offer by 3007. After a given interval, however, the market (and new offer) is again opened to all participants. Alternatively, rather than displaying the new offer to all bidders exclusively, the present invention may display the new offer to the highest bidders in succession for a given time interval.

When State

The When State is triggered by a trading command against an uncleared bid/offer by an aggressor who is not one of the original makers on the contra-side. Although the aggressor has entered a trading command, the system control will not allow this trading command by the new aggressor to be instantaneously executed. Rather, in accordance with the present invention, the trading processor creates a time interval or delay, and thereby provides the original maker(s) time to assess the new situation created by the aggressor by permitting response to the uncleared entry on the passive side.

In particular, as noted above, the uncleared status exists for a defined interval that is controlled by computer timer and system parameter designating an on/off condition for the When State. A When State is preferably only instituted during the time interval and when the parameter designates an on condition. The When State then lasts only until resolved by either the action of the original makers on the active side or by the expiration of the interval timer within system logic. Whether the system parameter is designating an on or off condition is a function of the liquidity and volatility of the underlying currency and is controlled by system logic.

During When State processing, the system displays the original makers (i.e., those participants existing with bid/offers outstanding prior to the entry of the new aggressor) and the new trader(s) entering via hit or take commands on the pending uncleared bid/offer so that they are clearly separated on the screen. See, for example, QUAD 2150 of FIG. 21 where makers 3002 and 3003 and trader 3001 are displayed. In the When State, the original makers are given the opportunity to trade at the new price point established by the aggressor, and multiple makers from the original list will each have access to take the new price in the order of their priority in the queue. The system will increment through each maker, and if the maker matches the buy/sell order of the aggressor, the maker becomes the aggressor. If this occurs, the logic departs the When State and enters the Qualified Workup State.

However, if the interval timer expires without any matching by the original makers, the When entries (one or several) will automatically trade and the original makers will not take part in this trade.

Figure 7:
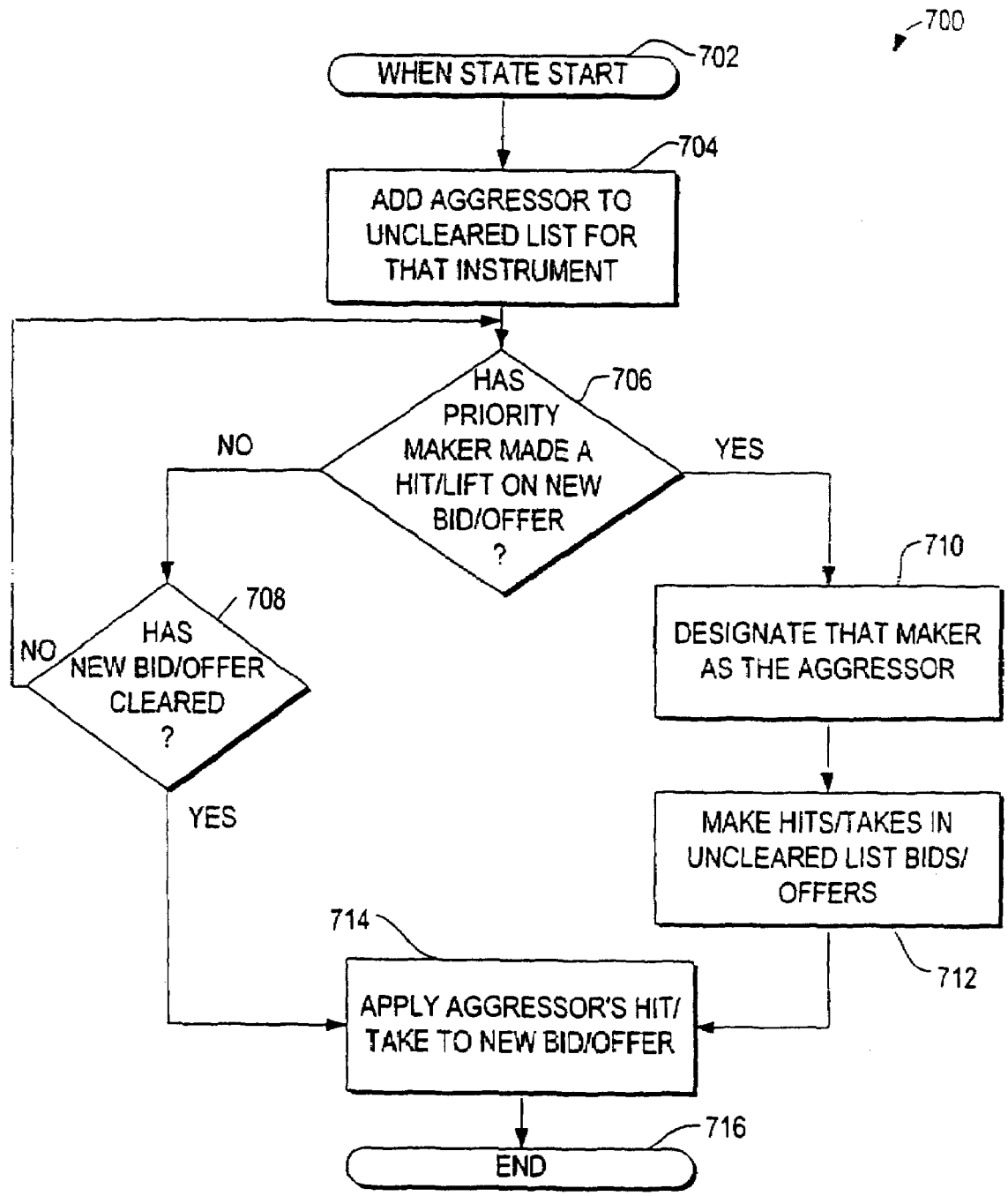
FIG. 7 is a flow diagram for a When State in accordance with one embodiment of the present invention.

One embodiment of a When State process 700 is depicted in FIG. 7. Once process 700 has begun at step 702, the aggressor initiating the When State is added to the uncleared list for this instrument at step 704. Next, at step 706, process 700 then determines whether a priority maker has made a hit/lift on the new bid/offer. Step 706 is preferably performed by sequencing through each of the makers on the active side of the trade and determining if the maker with the highest priority desires to make a hit/lift on the new bid/offer. If it is determined at step 706 that a priority maker has not made a hit/lift on the new bid/offer, process 700 then proceeds to step 708 to determine if the new bid/offer has cleared. If it is determined that the new bid/offer has not cleared, then process 700 loops back to step 706. Otherwise, process 700 applies the aggressor's hit/lift to the new bid/offer at step 714 and terminates at step 716. If it is determined at step 706, however, that a priority maker did make a hit/lift on the new bid/offer, then process 700 proceeds to step 710 to designate that maker as the aggressor and then to step 712 to make the hits/takes in the uncleared list bids/offers. Then, process 700 applies the aggressor's hit/lift to the new bid/offer at step 714 and terminates at step 716.

The following sequence example reflects the foregoing process 700. As shown in QUAD 2100 of FIG. 20, the Bid/offer State has two participants, CUST 3002 and 3003, each showing bids 2102 and 2104 at $10 million. Participant CUST 3007 has just placed an uncleared offer 2106 for $1 million (the uncleared status is indicated by the asterisk). Participant CUST 3001 wishes to take new offer 2106 by participant CUST 3007, but he can't do so right away. As shown in QUAD 2150 of FIG. 21, participant CUST 3001 attempts to take 2152 offer 2106 by participant CUST 3007, forcing the system into the When State and creating an uncleared list 2154 for the active side (i.e. the bid side, as shown). At this time, the pre-quantity of the first two bidders 2156 and 2158 is reduced to zero as the system logic requires that these bids cannot be enforced at the new price point. In this example, the interval timer provides both original makers 2156 and 2158 priority over participant CUST 3001 2152, and participant CUST 3002 2156 retains overall priority via placement in the queue.

Qualified Workup State

Transactions forming a trade take place in accordance with the present invention during the Qualified Workup State. The Qualified Workup State occurs pursuant to hits or lifts by an aggressor that is taking the entire inventory of volume shown on the passive side. Once established, the Qualified Workup State gives exclusive rights to the trade to the initial trader who is recognized as a qualified current worker. System-controlled parameters regulate the volumes of bids/offers and hits/takes that trigger the Qualified Workup State. These parameters discourage strategies that attempt to hold up markets through order and execution fragmentation. On screen, current workers may be highlighted in a defined manner to indicate who they are to the other participants. Current workers control the trade and can submit additional transaction volume to their contra-traders to the exclusion of outside participants. Current workers may include the aggressor (or possibly another trader on the active side that moves the trade into the "Workup" State by filling residual volume that needs "Workdown") and the participants on the passive side with bids/offers that were hit/taken at the time of entering the Qualified Workup State. Alternatively, on the passive side, only the highest priority participant may be designated as a current worker.

The status of current worker may terminate upon entry of "done" by the participant, by the lapsing of the trading inactivity interval, or by reaching a specified limit on the number of workups or amount of workups. Again, this interval is a pre-set system parameter designated by system logic. Absent such termination, current workers can trade almost indefinitely, as long as they continue to respond to their corresponding size offerings.

Figure 8:
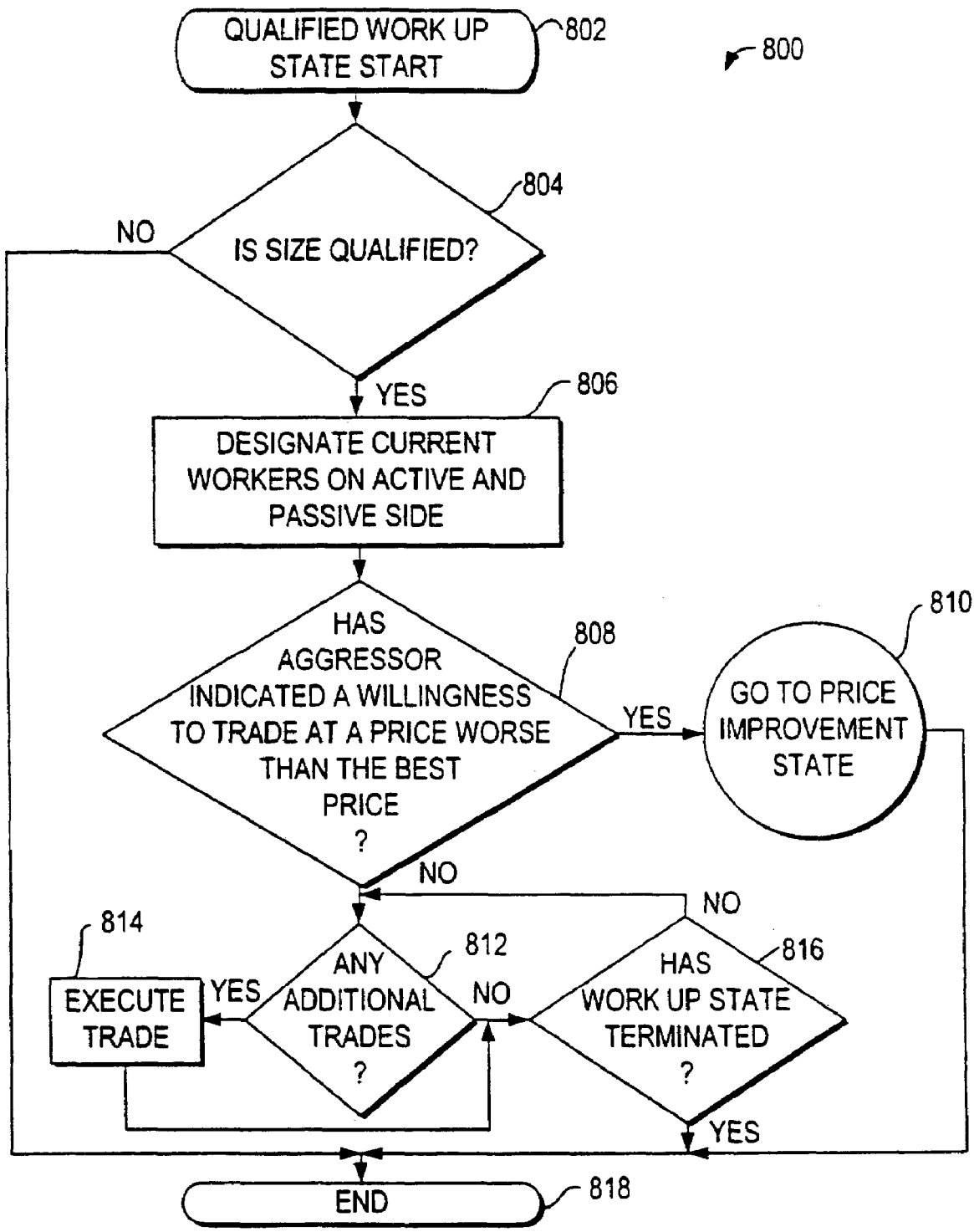
FIG. 8 is a flow diagram for a Qualified Workup State in accordance with one embodiment of the present invention.

One embodiment of a Qualified Workup State process 800 is depicted in FIG. 8. Once process 800 has begun at step 802, process 800 determines if the size of the bid/offer and/or hit/take qualifies for the Qualified Workup State at step 804. If the size of the bid/offer and/or hit/take is below the system-controlled threshold, the participant cannot participate in a trade workup and process 800 terminates at step 818. If the size qualifies at step 804, then process 800 designates the current workers on the active and passive sides at step 806. Then at the step 808, process 800 determines whether the aggressor has indicated a willingness to trade at a price worse than the best price. If so, then process 800 proceeds to step 810 where process 800 temporarily transitions to the Price Improvement State. Once the Price Improvement State terminates and retransitions to process 800 at step 810, process 800 terminates at step 818.

If it is determined at step 808 that the aggressor has not indicated a willingness to trade at a price worse than the best price, process 800 proceeds to step 812 to determine if any additional trades have been made. If it is determined that additional trades have been made, process 800 executes those trades at step 814. Once the trades have been executed at step 814, or if it is determined at step 812 that no additional trades have been made, process 800 determines if the Workup State has terminated at step 816. If the Workup State has not terminated, then process 800 loops back to step 812. Otherwise, process 800 terminates at step 818.

The above logic is better understood in the context of specific examples. A system without the Price Improvement feature is shown in QUAD 2200 of FIG. 22*a* with a typical opening bid/offer displayed.

Assume that bids 2202, 2204, 2206, and 2208 shown in the bid/offer State are all hit by participant CUST 3005 selling the entire size ($25 million) to the passive side. This results in participant CUST 3005 as the aggressor and the contra-traders (participants CUST 3001, 3002 and 3003) as the current workers. The market now enters the Qualified Workup State as the aggressor has taken all initial size from the passive side. Those with priority, the aggressor, since his size is above the qualification size, and the third bidder (participant CUST 3003), since his size is the largest of those on the passive side, are highlighted, as shown in QUAD 2220 of FIG. 22*b*.

Turning to QUAD 2240 of FIG. 22*c*, it can be seen that participant CUST 3003, as a qualified current worker, wishing to continue, adds an additional $15 million 2242 (adding to participant CUST 3003's original $10 million 2244) which is displayed as "15" under Buy.

A new participant CUST 3004 now offers $50 million 2246. New participant CUST 3004 must wait until the current qualified workers are done, and thus participant CUST 3004 is put in the When State. During this time, participant CUST 3005 is still in the Qualified Workup State and sells $10 million to participant CUST 3003.

Turning to QUAD 2260 in FIG. 22*d*, it can be seen that after termination of the Workup State, an additional $5 million is sold 2262 from participant CUST 3004 to participant CUST 3003, while leaving the remaining $45 million 2264 of participant CUST 3004 to be sold.

Price Retention State

As can be appreciated, various participant moves in the market are often fast paced, and, on occasion, position and price changes may occur almost simultaneously. An example of this may be one participant hitting another participant's bid of a certain price an instant after the bidding participant has significantly decreased the bid price. In this situation, the aggressor has now unexpectedly sold his size at a much lower price than the aggressor planned. Naturally, this situation can be very disturbing to aggressors in rapidly shifting markets.

A Price Retention State in the present invention addresses this problem. If a passive side price is decreased or increased just prior to a hit or lift command, the price retention state determines which price to apply to the hit or lift command based upon the amount of time between the time the price was changed and the subsequent hit or lift command. For example, if the price for an offer increases three-quarters of a second prior to an aggressor lifting the offer, the price retention state will apply the pre-increase price to the lift rather than the post-increase price.

Similarly, if a bid or offer is canceled just prior to a hit or lift of that bid or offer, or if a participant enters a hit or lift command just subsequent to another participant hitting or lifting a bid or offer, the price retention state signals to the potential aggressor that "no trade" has been completed.

While the Price Retention State does protect the aggressor from changes in price, it also preferably requires that the aggressor hit or lift the whole size that was posted in the bid or offer prior in order to receive the early price. Any remaining size at the new price is then left uncleared as an outstanding bid or offer. Others may also add more size on the passive side, but this new size is subject to the priority of the first bidder or offerer. Once the aggressor has hit or lifted the whole size of the bid or offer at the early price, the aggressor assumes current worker status and has the right to:

1. Hit or lift the bid or offer at the new price and thus possibly enter the Qualified Workup State with the contra-trader(s); and
2. Refuse the new price by entering a "done" command, and thereby leave the outstanding bid or offer waiting for a hit or lift, and cause the aggressor to lose priority.

Figure 9:
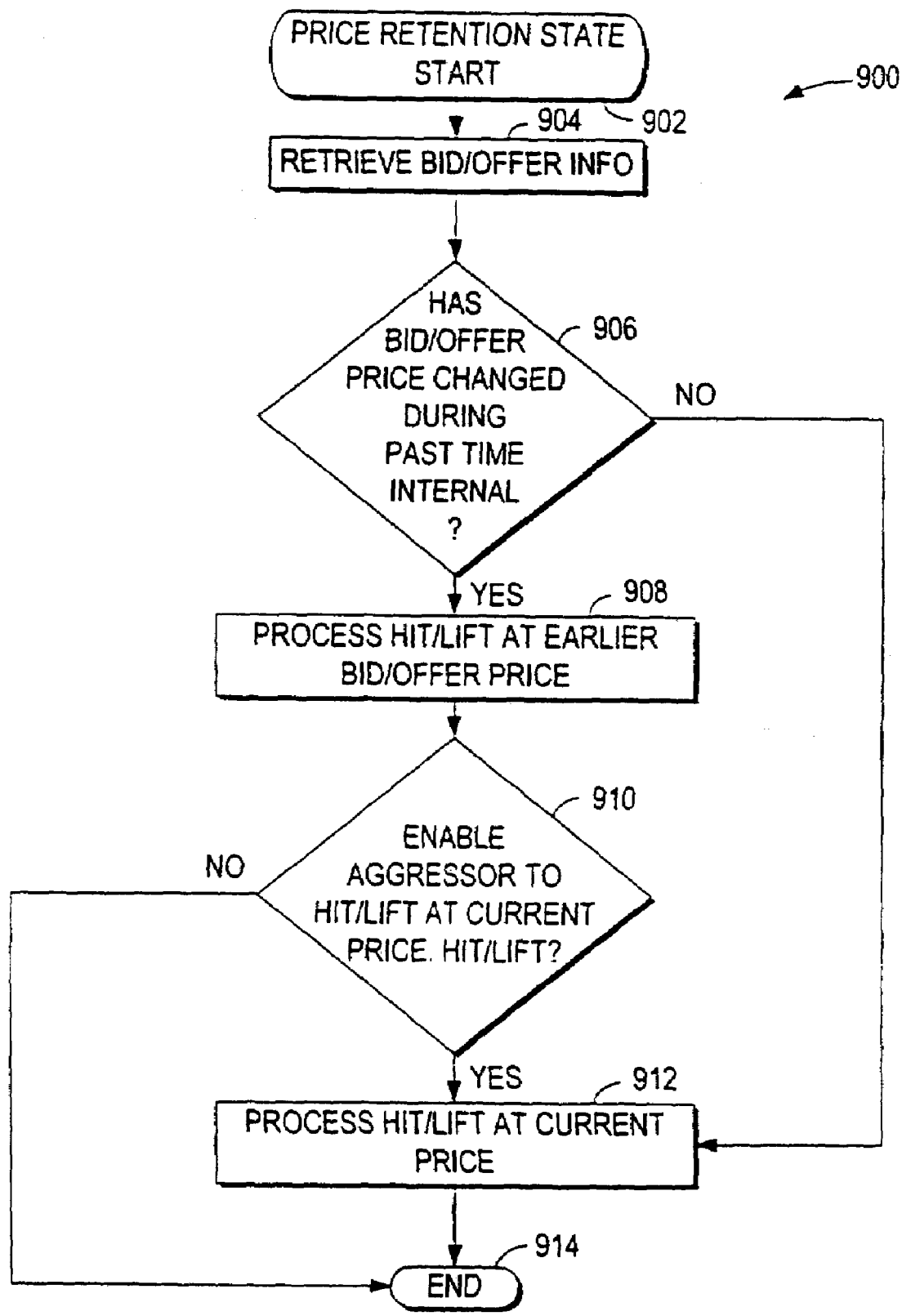
FIG. 9 is a flow diagram for a Price Retention State in accordance with one embodiment of the present invention.

One embodiment of the Price Retention State of the present invention is illustrated in FIG. 9. At any time a trade is executed in the present invention, e.g., in the Bid/Offer State, Qualified Workup State, and Price Improvement State, the Price Retention State is preferably initiated to verify the price of the trade. As shown, once process 900 has begun at step 902, process 900 then retrieves information relating to a bid or offer that was hit or lifted by an aggressor at step 904. Then, at step 906, process 900 determines if the bid/offer price has changed within a past time interval (e.g., two seconds). If the price has changed, then at step 908 process 900 processes the hit or lift at the earlier bid/offer price. Process 900 then enables the aggressor to hit or lift the bid or offer at the current price at step 910. If the aggressor does not hit or lift the bid or offer at step 910, then process 900 terminates at step 914. Otherwise, if the aggressor hits or lifts the bid or offer at the current price at step 910, or if the price did not change at step 906, then process 900 processes the hit/lift at the current price at step 912 and terminates at step 914.

These principles are illustrated in QUAD 2300 of FIG. 23*a* and QUAD 2350 of FIG. 23*b*. Prior to the time of the display shown in QUAD 2300, participants CUST 3001, 3002, and 3003 each placed bids 2302, 2304, 2306 to buy at 121.205 YEN/$ in sizes of $5 million, $1 million, and $1 million, respectively. In response to these bids, participant CUST 3007 entered a "HIT ALL" command to sell to bidders CUST 3001, 3002, and 3003. Unknown to participant CUST 3007, however, at an instant prior to placing the "HIT ALL" command, participant CUST 3004 placed a bid to buy at 121.100 YEN/$. Under the process of the Price Retention State, participant CUST 3007 is obligated to sell the $7 million at the original price of 121.205 YEN/$, and has the option of also selling the $10 million at 121.100 YEN/$ requested by participant CUST 3004, but is under no obligation to do so.

If Participant, CUST 3007 decides to hit the outstanding $10 million 2352 of participant CUST 3004, as shown in QUAD 2350 of FIG. 23*b*, the state moves out of Price Retention State and into the Qualified Workup State with participant CUST 3007 and participant CUST 3004 designated as the current workers. Participant CUST 3007 and participant CUST 3004 are highlighted in QUAD 2300 and QUAD 2350 to indicate that they are in the Qualified Workup State.

If participant CUST 3007 elects not to hit the bid of participant CUST 3004, the trade ends and the Price Retention State terminates.

Another aspect of the Price Retention State is the ability of the system to age all bids and offers through system controlled parameters. This provides participants with the ability to recognize and respond to commands that are entered by participants by requiring that the bids and offers are available for at least an aging period and thereby prevent "price noise" (i.e., bids and offers that are entered and then quickly removed) from excessive cancellations. Different currencies will have different parameter settings including the possibility of having zero aging.

Price Improvement State

The Price Improvement State of the present invention addresses the situation in which an aggressor has indicated a willingness to trade at prices worse than the best price bid or offered by another participant. When an aggressor indicates such a willingness, any amount that the aggressor keeps in a buy or receives in a sell over that which the aggressor would have had at the worst acceptable price is a surplus. To encourage participation in price improvement trading, this surplus is distributed among the participants to a price improvement trade.

From the Qualified Workup State, the Price Improvement State is preferably initiated by the aggressor indicating a willingness to trade at a price worse than the best price. Once initiated, the Price Improvement State then determines if a better priced buy/sell has been entered by another trader.

For example, in a Workup trade, a non-priority passive trader may enter a better priced buy/sell than that previously traded by the initial "best" passive trader with the aggressor. By entering this better priced buy/sell, the non-priority passive trader has shifted the price point of the trade to something between the new better price and the original trade price. If the initial "best" passive trader matches this new better price, then the trade will be consummated between the initial "best" passive trader and the aggressor. Otherwise, if the initial "best" passive trader does not match the new better price, then the trade will be consummated between the non-priority passive trader and the aggressor. In either case, by entering the better priced buy/sell, the non-priority passive trader has improved the price for both sides of this trade.

An illustration of a situation in which price improvement trading may take place is shown in QUAD 2400 of FIG. 24*a*. As can be seen, there are three levels 2402, 2404, and 2406 of bids and offers shown. The number of levels of bids and offers that are actually displayed on a workstation is a system parameter and is typically tied to the number of price increments on the bid and offer sides, although any basis for setting this number could be used. From this display, the participants would be aware that there are four bids 2408, 2410, 2412, and 2414 for a total of $90 million, ranging from 124.20 down to 123.90, and five offers 2416, 2418, 2420, 2422, and 2424 for a total of $85 million, ranging from 124.30 up to 124.50. If, however, only a single level of bids and offers were displayed, then the participants would only be aware that there are two bids 2408 and 2410 for a total of $25 million at 124.20, and two offers 2416 and 2418 for a total of $15 million at 124.30.

Once trading has commenced, a new seller in the illustration of QUAD 2400 may become the aggressor with a command to sell 150 million down to 123.70. In this case, the aggressor has in effect hit all of the bids 2408, 2410, 2412, and 2414 shown on the passive side of the display ($90 million in size) and therefore qualified to enter the Qualified Workup State. Since the aggressor has also indicated a willingness to sell down to 123.70 (a price that is worse for the aggressor than the best price of 124.20), the Qualified Workup State transitions to the Price Improvement State (see FIG. 8). In the Price Improvement State, the first best qualified bidder is then given the opportunity to buy additional volume at an improved price after the $90 million has been hit. The improvement in the price for the subsequent trade is allocated between the price originally bid by the passive trader that trades with the aggressor and the aggressor's worst price (i.e., the 123.70 reservation price). If all of the remaining trade is done between buyer 2001 and the aggressor, then a Price Improvement trade of $60 million at 123.95 may then be consummated. The price of 123.95 is merely an average of price of 124.20 (the passive trader's bid price) and 123.70 (the aggressor's worst price). Although, an average is used here for illustration to calculate the improvement price, other methods to calculate the improvement price could be used. In this example, buyer 2001 can maintain its priority by committing to buy $60 million more at the bid price of 124.20. However, the actual trade price is 123.95, thus providing both the buyer and the seller with a 0.25 price improvement.

As mentioned above, the improvement price may simply be an average between the bid price of the passive trader and the worst acceptable price of the aggressor. However, other methods of determining the improvement price may also be used, such as setting the improvement price at two-thirds of the difference between the bid price and the worst price in favor of the aggressor (e.g., 124.03 in the example above), setting the improvement price at the bid price to fully benefit the aggressor, etc. The method used to calculate the improvement price could also change dynamically depending upon the size of the trade or upon any other factor or set of factors.

Once the trades have been executed, the present invention would then indicate to the participants the trades that took place. One method of doing so would be to display the four trades individually as: "25@124.20," "20@124.00," "60@123.95," and "45@123.90." Preferably, an indicator would also be displayed to indicate which of the trades are Price Improvement trades. Alternatively, the average price, only the lowest price, or the total size and the average price of the trades could be displayed.

In the present invention, multiple bids/offers at different price levels may be displayed in a variety of ways. One approach is to not display any out-of-market bids/offers, i.e., all inferior offerings are not displayed. A second approach is to provide the bidder/offerer with a choice as to whether the bidder's/offerer's inferior bid/offer is displayed when topped with a better price. A third approach is to display all bids/offers even when those bids/offers are topped. In the third approach, this forms a "good till cancel" offering. A fourth approach allows participants to customize the display of their bids/offers so that they are displayed based upon one or more factors, such as time, size, and/or price characteristics.

In order to improve the opportunity for price improvement and to protect the price improvement aggressor, all buy and sell orders received during the aggressor's exclusive time may be ranked and matched to provide the greatest amount of price protection to the price improvement aggressor. Because of multi-levels of bids/offers, the first best qualified bidder/offerer will maintain priority only if it responds at its price, or if necessary, matches the best When Take price (i.e., a price provided by another passive trader that is in the When State).

Another example of the Price Improvement State processing is shown in QUADS 2430 and 2470 of FIGS. 24*b* and 24*c*. After four initial bids are placed by participants CUST 2001, 2002, 2005, and 2012 for sizes of $10 million, $1 million, $20 million, and $45 million, respectively, the following entries may be made as shown in QUAD 2430 and QUAD 2470. As illustrated in QUAD 2430, in response to each of these bids, a participant CUST 2008 may become the aggressor by initiating a price improvement trade by committing to sell $90 million down to a price of 123.80. As a result of this action, participant CUST 2008 will hit each of the bids by participants CUST 2001, 2002, 2005, and 2012, for a total initial trade of $76 million. By hitting the entire size of the participant side, participant CUST 2008 enters the Qualified Workup State. During the exclusive time provided in the Qualified Workup State, participant CUST 2001 commits to buy $5 million more at 124.20, and participant CUST 2009 commits to a WHEN TAKE of $10 million more at 124.30.

By having been the original best qualified bidder, participant CUST 2001 has priority over participants CUST 2002 and 2009. If participant CUST 2001 does not match the WHEN TAKE price of 124.30 at the end of the exclusive time of the Qualified Workup State, $10 million of the $14 million to be sold by participant CUST 2008 is matched with the best buy shown—i.e., the When Take $10 million of participant CUST 2009. The remaining $4 million is sold to participant CUST 2001. By not matching the 124.30 price, CUST 2001 only obtains the remainder of $4 million. By maintaining price and time priority, price improvement is obtained and the aggressor is protected. The trades are shown in QUAD 2470.

Figure 10:
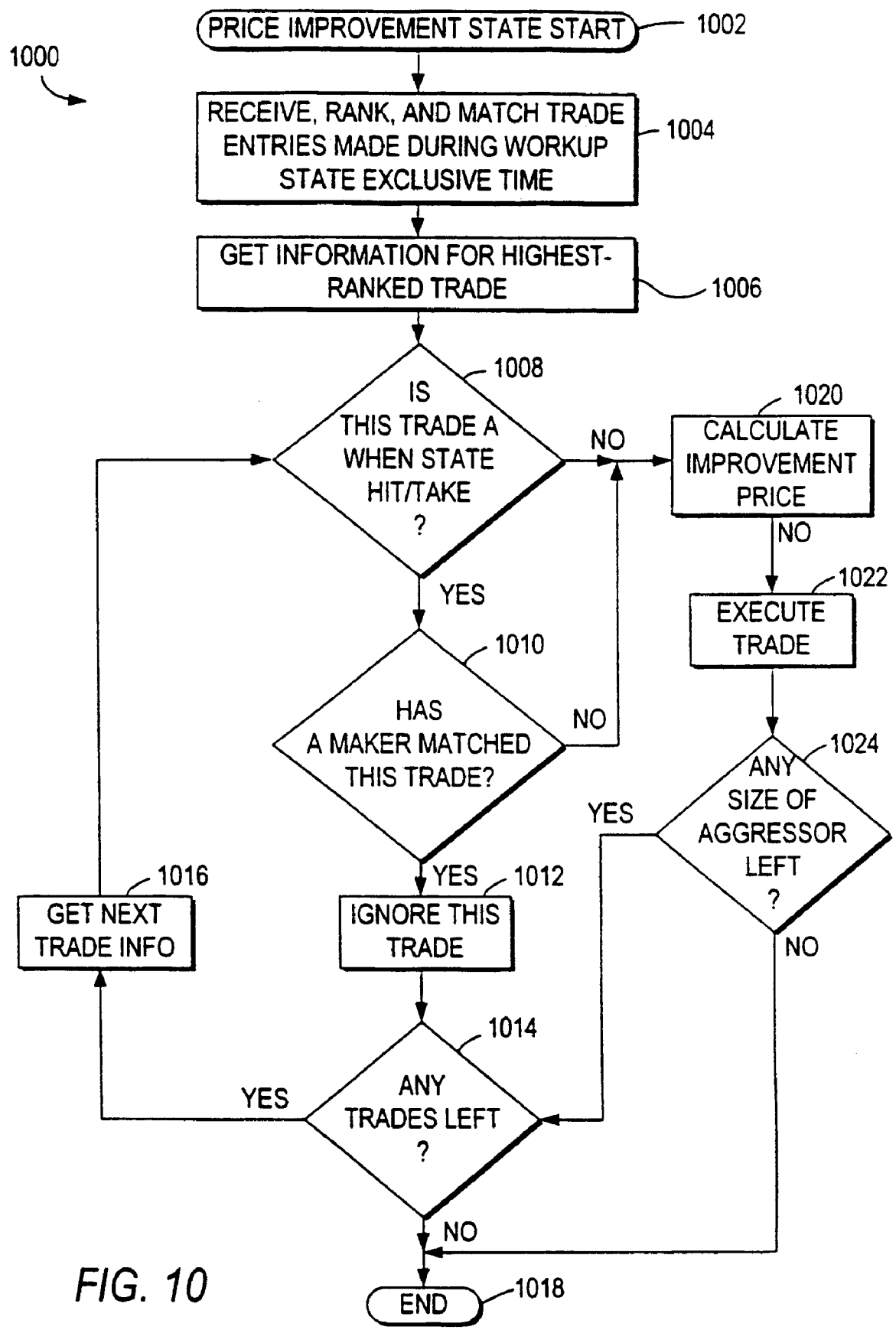
FIG. 10 is a flow diagram for a Price Improvement State in accordance with one embodiment of the present invention.

One embodiment of a process 1000 for the Price Improvement State of the present invention is shown in FIG. 10. As illustrated, once process 1000 has begun at step 1002, the process proceeds to step 1004 where trade entries are received, ranked, and matched during the Workup State exclusive time as described above. Next, at step 1006, process 1000 gets the information for the highest-ranked trade to begin processing the trades. At step 1008, it is then determined if this trade is a When State hit/take. If the trade is determined to be a When State hit/take at step 1008, process 1000 then determines at step 1010 if a maker has matched the trade. If a maker has matched the trade, then the trade is ignored at step 1012. Next, process 1000 determines if any trades are left at step 1014, and if there are, the next trade information is retrieved at step 1016 and process 1000 loops back to step 1008. Otherwise, if no trades are left, process 1000 terminates at step 1018.

If it is determined at step 1008 that the trade is not a When State hit/take or if it is determined at step 1010 that a maker has not matched this trade, then at step 1020 the improvement price for this trade is calculated. Once the improvement price has been calculated, the trade is executed at step 1022. Next, process 1000 determines if any size of the aggressor is left at step 1024. If there is size left, process 1000 then branches to step 1014 to determine if any trades are left, and if so, the next trade process 1000 gets information at step 1016 and loops back to step 1008. Otherwise, if there is no size left or if there are no trades left, process 1000 terminates at step 1018.

Request for Market State

A Request For Market State enables a buyer or seller to indicate to the market that the buyer or seller wants to know what price the market will bear for an indicated instrument. In preferred embodiments of the invention, this may be accomplished by the system indicating that there is a participant interested in either buying or selling a given size, although the market does not know which. This indication is made to the market through a Request For Market.

Responses to the Request can be made by bidders, offerers, and market makers, i.e., participants who are prepared to either buy or sell depending on the spread quoted. Upon responding to the Request, the Request For Market State may rank existing and responded bids and offers and check trade qualifications, and, when size is met, trades are executed within the parameters of the reservation price, providing price improvement where possible. Respondents to the Request are rewarded by knowing how many bidders and offerers responded to the request. Furthermore, to protect respondents, the hidden aggressor will not be able to see the individual bids and offers.

Figure 11:
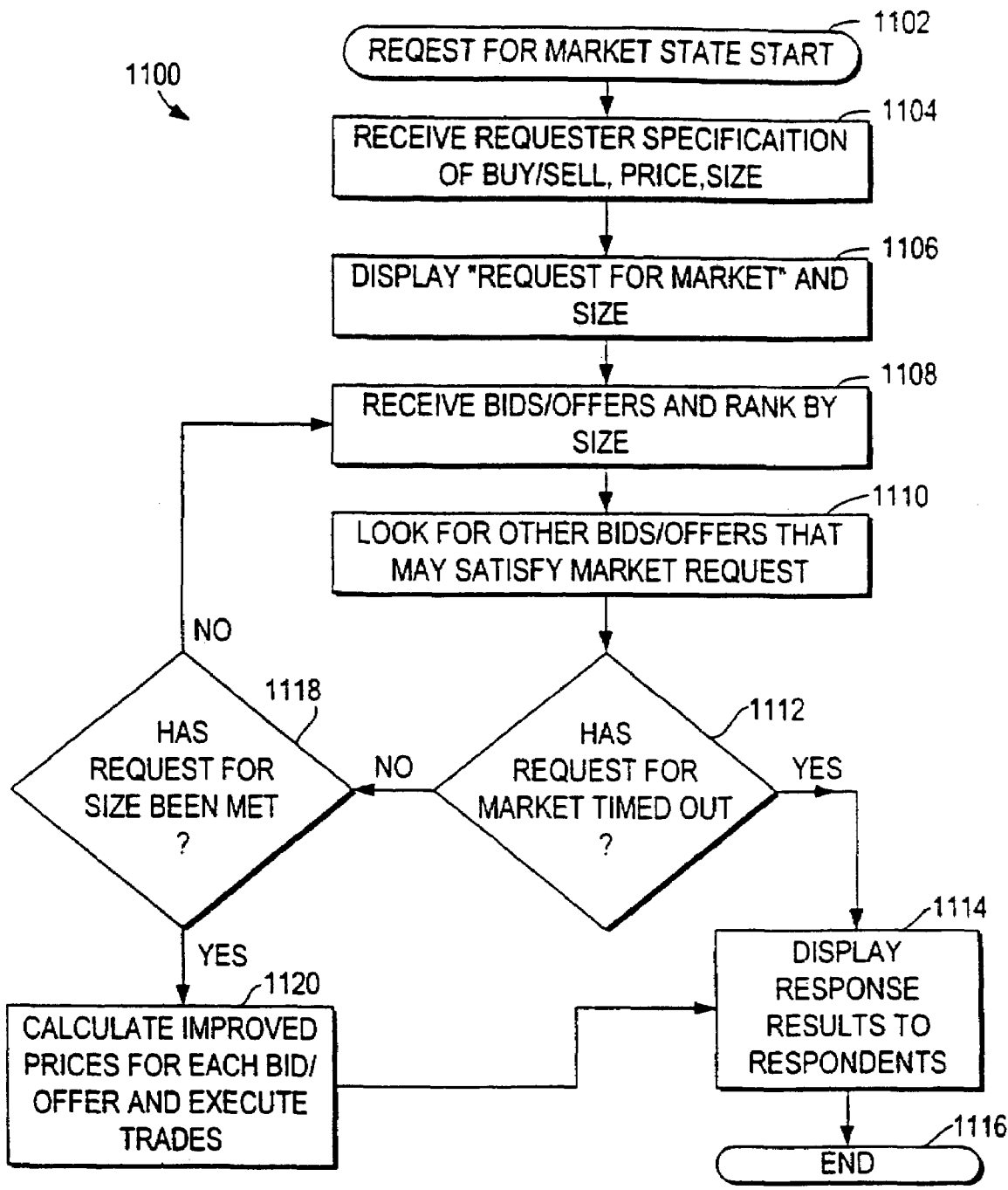
FIG. 11 is a flow diagram for a Request for Market State in accordance with one embodiment of the present invention.

One embodiment of process 1100 for a Request For Market State is illustrated in FIG. 11. As shown, once process 1100 has begun at step 1102, the requestor's specification of buy or sell, the reservation price (worst acceptable price), and size are received at step 1104. Next at step 1106, process 1100 displays to other participants a Request For Market along with the size of the request (though not the reservation price and whether it is a buy or sell). At step 1108, process 1100 receives bids/offers in response to the Request and ranks them by size. Process 1110 also monitors other bids/offers in the system to see if they satisfy the market request at step 1110. Then, at step 1112, the process determines if the request for market has timed-out. If it has, then the response results are displayed to the respondents at step 1114 and the Request For Market State terminates at step 1116. Otherwise, if the Request For Market has not timed-out, then process 1100 determines if the requestor's size has been met at step 1118. If the size has not been met, then the process loops back to step 1108. Otherwise, the process calculates improved prices for each of the bids/offers making up the size, and executes the corresponding trades at step 1120. Once the trades have been executed at step 1120, the response results are displayed to the respondents at step 1114 and the Request For Market State terminates at step 1116.

Alternatively, the Request for Market State may execute any bids/offers that meet a given percentage of the requester's size upon the request timing-out.

Restore State

In order to accommodate participants' desires and strategies with respect to their bidding/offering and buying/selling, the present invention allows participants to automatically initiate bids/offers upon a trading state change. This may be desirable to replicate a bid upon that bid being hit. For example, assume that participant CUST 2001 is the first qualified bidder bidding 124.20 Yen/$ for $5 million. Behind that bid is another bid for $2 million at the same price. Next, assume that participant CUST 2005 becomes an aggressor and hits the $5 million bid, after which the trade clears or is done. Participant CUST 2001 may desire to have its first bid replicated so that it can receive $10 million in size before the trade clears or is done. The Restore State of the present invention enables this replication by automatically restoring the same size bid at the same price without having to re-input the bid command based upon participant controlled parameters. The Restore State controls the priority given to that automatically restored bid. Position in the queue may be determined by a metric derived from factors that may include any of price, time, volume, and qualification ranking. In its simplest form, the first qualified bidder can maintain first position or be put at the end of the queue using only time of arrival as the metric.

Other parameters allow the participant to time bids/offers, e.g., always be the best or worst by a certain increment or create a customized algorithm or metric to allow the Restore State to automatically control quantitatively bids/offers. For example, decrease a bid by 0.10 if $100 million is shown on either side. Utilization of the parameters is useful in fast or volatile markets. By allowing the Restore State to control commands that automatically direct bidding/offering and buying/selling, e.g., allowing a participant to automatically be the best bidder/offerer for a given size, the present invention improves trading efficiency and thereby provides participants with ability to further control risk.

Figure 12:
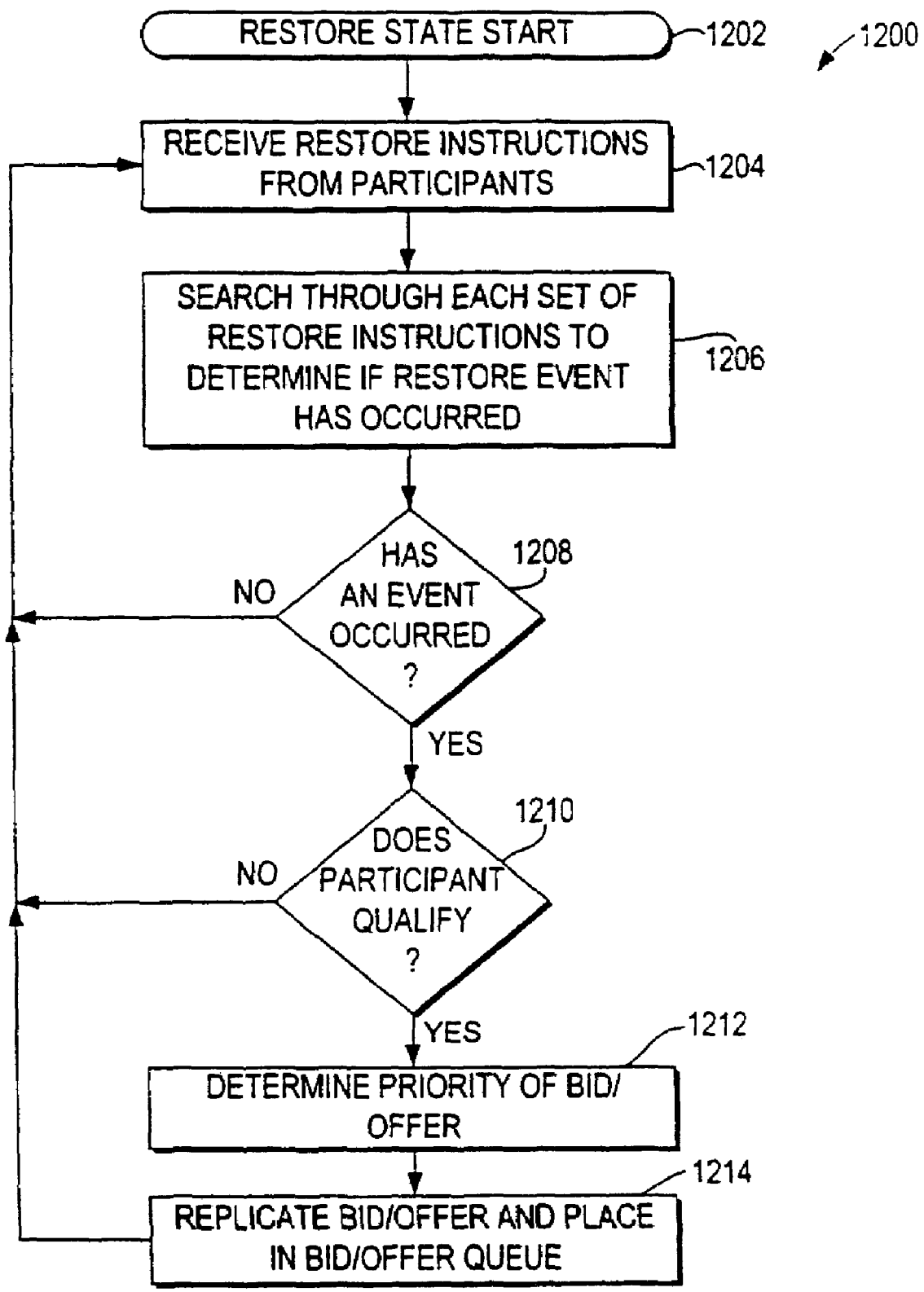
FIG. 12 is a flow diagram for a Restore State in accordance with one embodiment of the present invention.

One embodiment of a Restore State process 1200 is illustrated in FIG. 12. As shown, process 1200 begins at step 1202. Next, at step 1204, this process receives restore instructions from participants. Preferably, these instructions define the event that must occur before the bid/offer will be replicated. In preferred embodiments, the event may only be based upon time, size, price, and qualification ranking, although other factors could also be used. When appropriate, at step 1204, the Restore State preferably alerts a participant that instructions entered are invalid and that new instructions should be entered. Next, at step 1206, process 1200 searches through each set of restore instructions for events that may have occurred. Then, at step 1208, this process determines whether an event has occurred, and if not, the process loops back to step 1204. Otherwise, if an event is determined to have occurred, then process 1200 determines if the participant qualifies at step 1210. Preferably the participant will qualify for the Restore State only if the participant is the first qualified bidder/offerer, although any other criteria or criterion could be used to determine if a participant qualifies—including allowing all or none of the participants to qualify. If it is determined at step 1210 that the participant does not qualify, then process 1200 loops back to step 1204. Otherwise, the process determines the priority of the bid/offer at step 1212 and replicates the bid/offer and places it in a bid/offer queue at step 1214. After the replicated bid/offer has been placed in a queue at step 1214, process 1200 loops back to step 1204.

Price Generation State

The Price Generation State of the present invention may be used to anchor the price difference or swap price of a price difference trade (e.g., a currency swap) to an underlying reference price and to alert participants to that price at the time of bids and offers.

The benefit of this state may be illustrated by referring to known systems. In such systems for currency swaps, for example, the currency swaps are quoted and traded as a separate market instrument from the spot market. Nevertheless, the prices that are quoted for these swaps are highly dependent upon the price for the underlying currencies in the spot market. Because the prices in the spot market can change rapidly, the value of currency swaps may end up changing over the time that a bid or offer is displayed at a fixed price. Additionally, because participants may not have agreed upon the spot market price during the time from when bids and offers were placed through when the bids and offers are hit and taken, participants frequently cancel swap trades because of an inability to later agree upon spot market prices.

Referring to QUAD 2500 in FIG. 25*a*, it can be seen that a bid/offer for the one-month currency swap in the dollar-Yen market is quoted at 34 pips bid, 30 pips offered (where a "pip" is 0.01 in price). As also shown, the spot price in the spot market is 124.60-70 (i.e., 124.60 bid, 124.70 offered). In order to fix the one month currency swap to the underlying spot price, the present invention selects and displays a reference price of 124.65 for the currency swap as shown. In this example, the price is merely an average of the bid and offer spot prices. However, any metric of price, volume and time may be used to select the reference price.

Figure 25B:
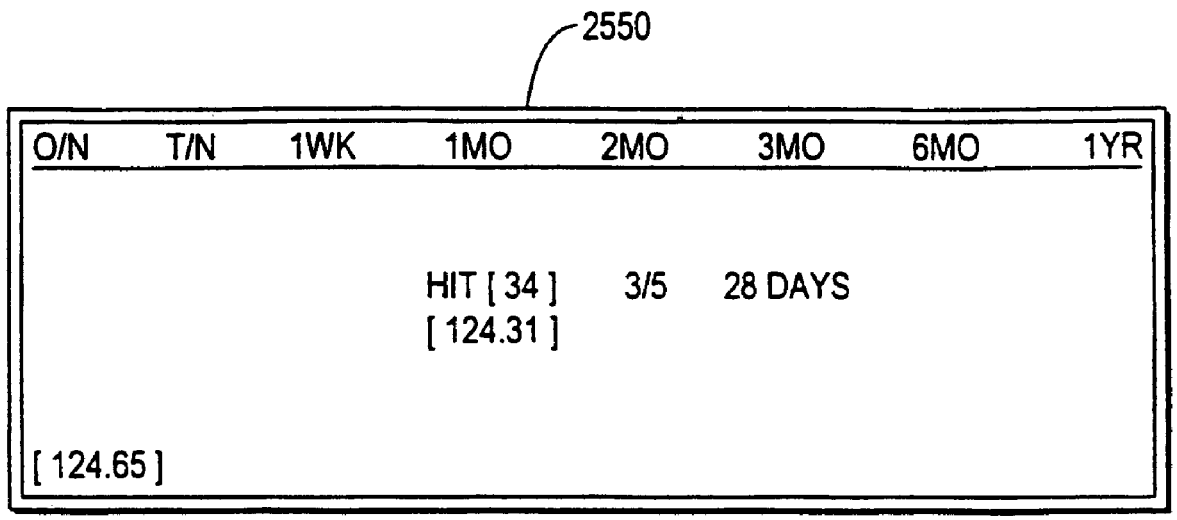

In this way, the participants are relieved of the need for direct negotiation, and enabled to mark their positions to market, as shown in QUAD 2550 of FIG. 25*b*. As can be seen, because the bid for 34 for the swap was hit, the marked to market price for the swap is 124.31 based upon the reference price of 124.65.

Figure 13:
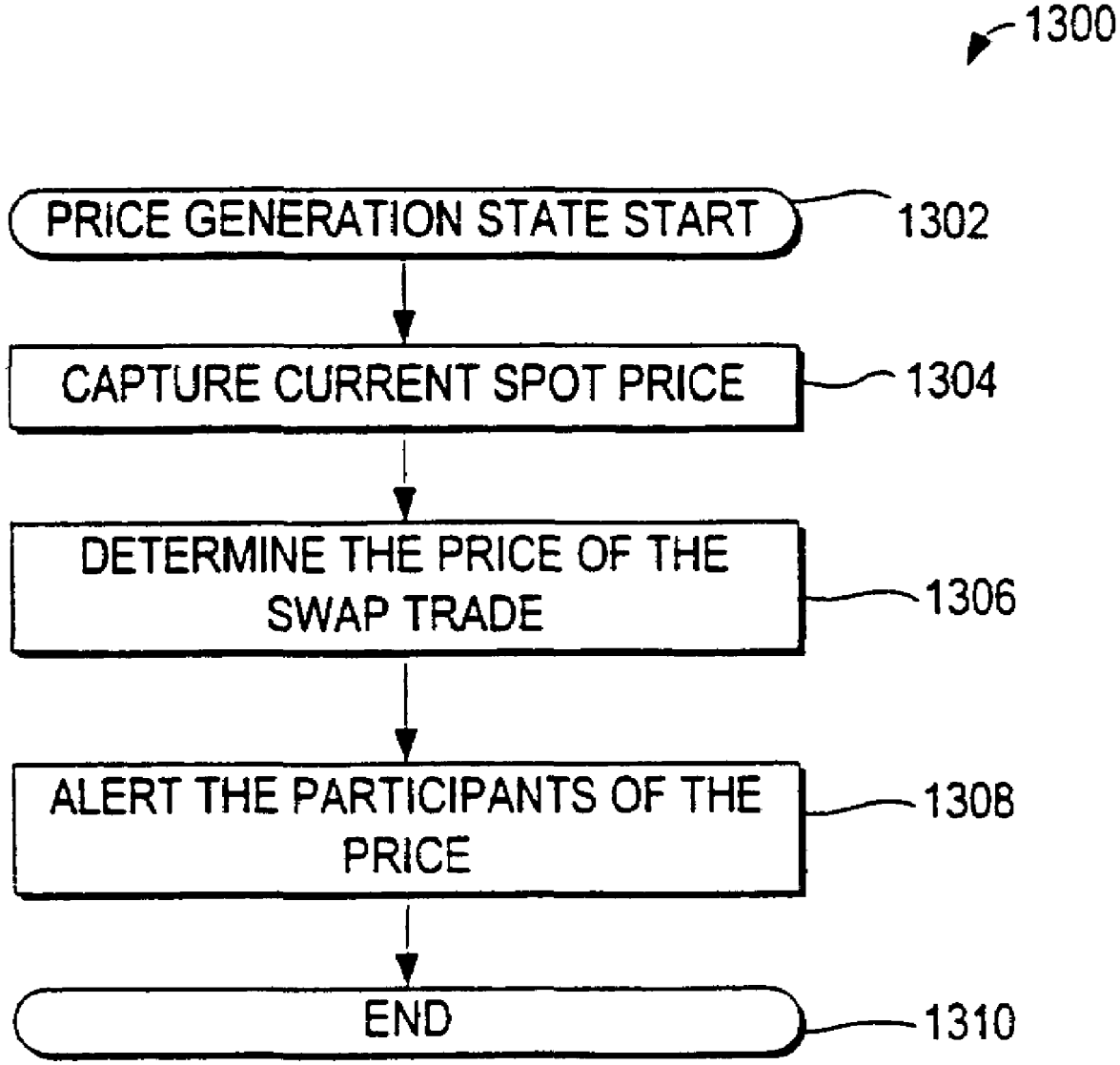
FIG. 13 is a flow diagram for a Price Generation State in accordance with one embodiment of the present invention.

One embodiment of a Price Generation State process 1300 of the present invention is illustrated in FIG. 13. As shown, once process 1300 has begun at step 1302, the process captures the current spot price for the current bid/offer at step 1304. Then, at step 1306, process 1300 determines a swap reference price for the swap trade using the current spot price and the swap bid/offer price. Finally, the participants are notified of this reference price at step 1308 and process 1300 terminates at step 1310.

In other embodiments of the present invention, the pips that are displayed as bids and offers for a currency swap (in the example of FIG. 25*a*, 34-30) can be automatically modified to track the underlying spot market price rather than fixing a reference price for the bid or offer. In this way, an aggressor could hit or lift the price when the price appeals to the aggressor. If the bidder or offerer feels that the bid or offer has become undesirable because of the changes to the bid or offer due to the underlying spot market price, the bidder of offerer could cancel the bid or offer at any time prior to it being hit of lifted.

Position Conversion State

The Position Conversion State of the present invention allows participants to value and convert a position that is associated with a trade so that the effective value date of the trade is later in time than the pre-conversion value date. This may be advantageous when the participant anticipates that the position will increase in value as time progresses from the pre-conversion value date to the effective value date. For example, a long futures spot Dollar position traded at 9:00 a.m. at 124.10 Yen/$ on Feb. 3, 1999 has a value date of Feb. 5, 1999. If the participant desires to move the effective value date to Feb. 8, 1999, the Position Conversion State of the present invention may be utilized to change the pre-conversion value date of Feb. 5, 1999 to the effective value date of Feb. 8, 1999.

In order to convert a position from one value date to another, a participant effectively borrows one currency while simultaneously lending another. Because of interest rate arbitrage, the participant may either spend or receive a net interest rate while simultaneously borrowing one currency and lending another. This net interest rate is the equivalent rate for extending the value date of the position from a pre-conversion value date to an effective value date, and is also a component of the cost of carrying the position between value dates.

In continuing the example above, the participant would pay or receive the net interest rate for simultaneously lending and borrowing Dollars and Yen from Friday, February 5, to Monday, February 8. In this case, the net interest rate, or spot/next rate, is a three-day rate—one business day plus two weekend days. By choosing to roll the value date from Friday to Monday, the participant has essentially converted its position into a different one.

The Position Conversion State allows the participant to set up when rollovers occur, and preferably automatically rolls over a position to the next day if the participant fails to indicate to do otherwise. For example, a participant who buys $25 million spot Dollars for delivery against Yen at 9:00 a.m. on Wednesday, may select whether to rollover the position or not at the time of the trade or may choose to defer decision of whether to roll over the trade until the close of trading. By deferring its position, the participant maintains its option of selling $25 million spot dollars against Yen until the close of trading (in case the participant wants to net out the buy transaction and the sell transaction so that its position is zero). If the participant chooses to defer to roll over the trade until the close of trading and fails to do so manually, the Position Conversion State of the present invention automatically converts or rolls over the spot transaction for a value date that is one day later than the pre-conversion value date.

In order to effect such rollovers, the Position Conversion State also preferably determines the net interest rate that the participant either pays or receives. In the example above, this rate is the price or rate of a spot/next transaction in the Dollar/Yen market. The Position Conversion State determines the rate by polling various currency lenders for their rates. Based upon these rates, the Position Conversion State then calculates the net interest rate. For example, in one embodiment, the Position Conversion State may average the middle six of eight rates received from lenders for spot/next Dollar/Yen (three days) from Friday, February 5 to Monday, February 8.

Finally, the Position Conversion State applies the rate to the participants for the trade and accordingly credits one side and debits the other side for that net interest rate over the conversion period.

Figure 14:
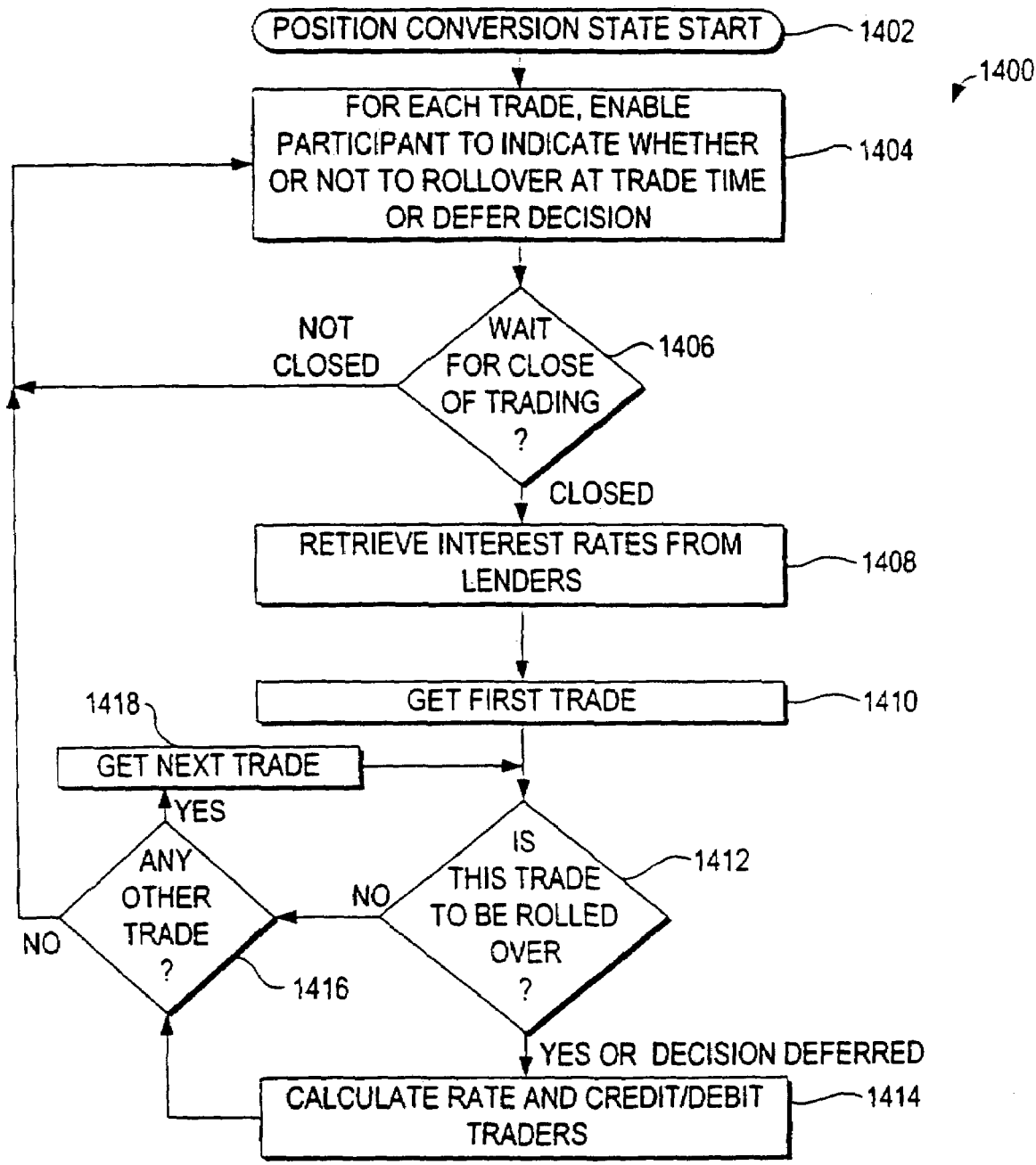
FIG. 14 is a flow diagram for a Position Conversion State in accordance with one embodiment of the present invention.

One embodiment of a process 1400 for a Position Conversion State is illustrated in FIG. 14. As shown, once process 1400 has begun at step 1402, the process allows a participant to indicate whether or not to rollover a trade at trade time or to defer the participant's decision at step 1404. At step 1406, process 1400 waits for the close of trading. If it is determined that the close of trading has not occurred, then process 1400 loops back to step 1404. Otherwise, the process proceeds to receive interest rates from lenders at step 1408. These interest rates are used to calculate the price conversion costs/gains. Then at step 1410, process 1400 retrieves the first trade. Next at step 1412, the process determines whether this trade is to be rolled over. This may have been indicated by the participant as "yes" or "no," or may have been deferred. If the participant indicated "no," then process 1400 determines if there are any other trades to process for position conversion at step 1416. If there are, then the process gets the next trade at step 1418 and loops back to step 1412. Otherwise, if there are no more trades, then process 1400 loops back to step 1404 to wait for more trade entries. If it is determined at step 1412, however, that the trade is to be rolled over or if the participant deferred decision of whether to roll over the trade, then process 1400 rolls over the trade by calculating the rate for the rollover and by crediting and debiting the traders at step 1414. Once the trade has been rolled over, process 1400 branches from step 1414 to step 1416 to determine if any more trades are to be processed for position conversion.

Marking to Market State

Participants need measures that value transaction activity. In a risk environment, market price changes create profit and loss to long or short positions. The Marking to Market State of the present invention allows participants to dynamically measure a single transaction or a set of transactions. The measure, or "fixing" of a set of prices, may be used for profit and loss risk measurement, margining requirements, financial settlement and invoicing, etc.

Using the Marking to Market State, a participant can select measures that are applicable. For example, a participant may want to select the average weighted price of the last five minutes of trading as its marking to market measure. Another participant may select the weighted average trades that take place between 10:00 a.m. and 2:00 p.m. London time as its marking to market measure. This later measure is particularly useful to a bank's foreign currency manager who may oversee traders in both New York and London.

Also using the Marking to Market State, participants can group market activity to create a subset of transactions that can be marked to market at any time and from time to time, or dynamically as the market changes.

These marking to market measures may then be passed to the Participant Qualification State to allow participants to better control both their own and counter party risk.

Figure 15:
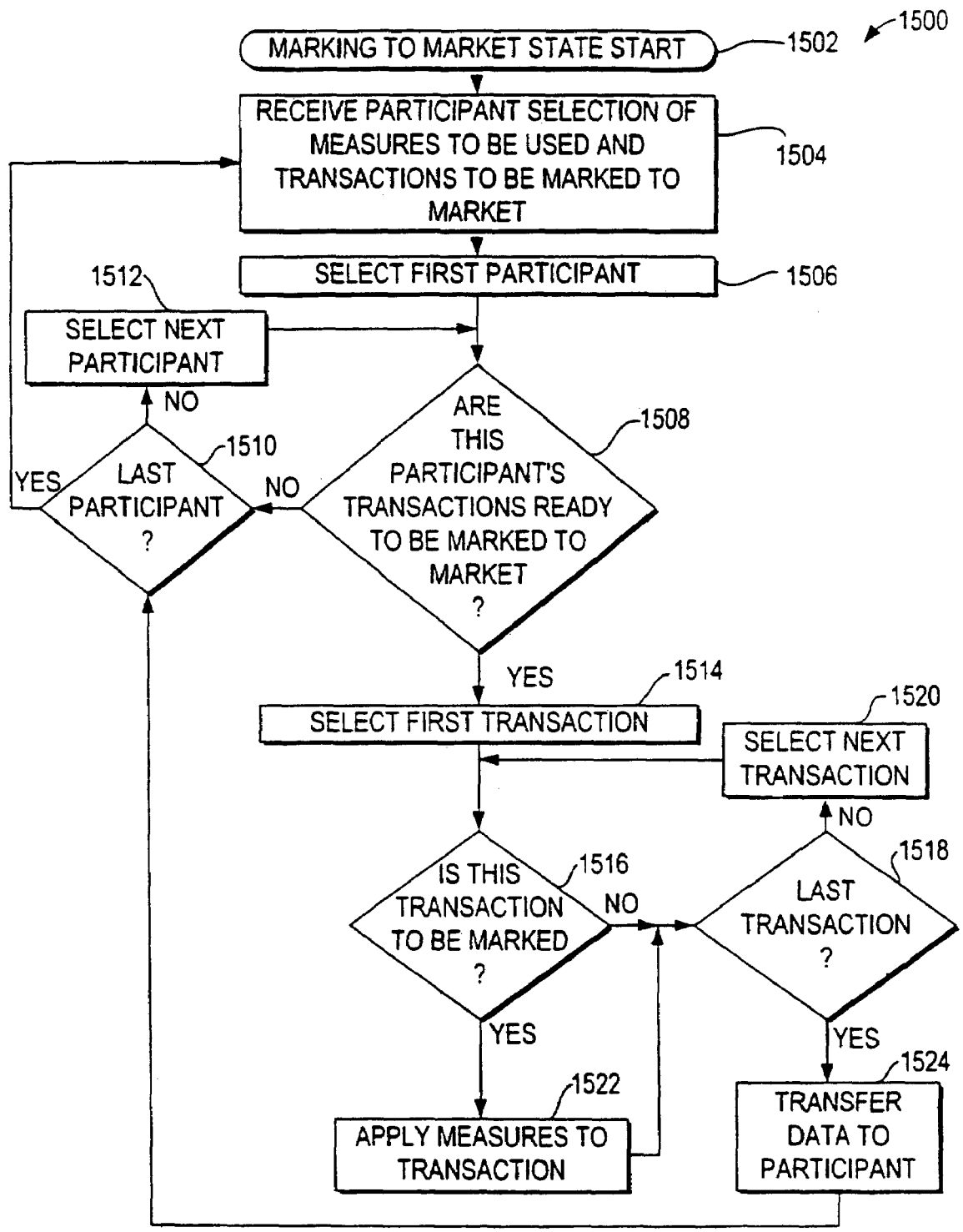
FIG. 15 is a flow diagram for a Marking to Market State in accordance with one embodiment of the present invention.

One embodiment of a process 1500 for the Marking to Market State is illustrated in FIG. 15. As shown, once process 1500 has begun at step 1502, the process receives participant selections of measures to be used and transactions to be marked to market at step 1504. Any suitable measures can be used on any portion of the transactions by a participant. Next, at step 1506, the process selects the first participant. Then, at step 1508, process 1500 determines if the participant's transactions are ready to be marked to market. If the transactions are not ready, then the process determines if this is the last participant at step 1510. If this is not the last participant, process 1500 selects the next participant at step 1512 and loops back to step 1508. Otherwise, if this is determined to be the last participant at step 1510, then process 1500 branches to step 1504.

If at step 1508, however, it is determined that the participant's transactions are ready to be marked to market, then process 1500 selects the first transaction at step 1514. Next, this process determines if this transaction is to be marked to market at step 1516. If the transaction is not to be marked to market, then process 1500 determines if this transaction is the last transaction at step 1518. If this is not the last transaction, process 1500 selects the next transaction at step 1520 and loops back to step 1516. Otherwise, if it is determined at step 1518 that this is the last transaction, then the process transfers the data to the participant at step 1524. This data may be displayed as a total volume, an average price, a net position, a weighted average price, or as any other suitable information, for the corresponding transactions. Once the data has been transferred, process 1500 branches to step 1510 to determine if this is the last participant.

If at step 1516, however, it is determined that this transaction is to be marked to market, then process 1500 applies participant-selected measures to the transaction at step 1522 and branches to step 1518 to determine if there are any more transactions.

Delivery State

In preferred embodiments of the present invention, a Delivery State is provided through which a participant to a trade is able to settle and close-out the trade rather than roll over, or continue to roll over, the trade through a mechanism such as the Position Conversion State. For example, in the instance where an exporter of soy beans has agreed (in May) to make a delivery (in December) of soy beans to Japan in exchange for a large sum of Yen, the exporter may choose to lock-in (in May) the value of his agreement in Dollars by entering into a futures contract to buy Dollars in exchange for the large sum of Yen to be received from his soy bean agreement. Through the soy bean agreement and the futures contract, the exporter has arranged in May to sell soy beans in exchange for a fixed sum of Dollars, regardless of the value of Yen versus Dollars in December. Because the exporter presumably wants the cash from his soy bean sale, the exporter will want to settle and close-out his futures contract in December rather than roll over that contract.

Figure 16:
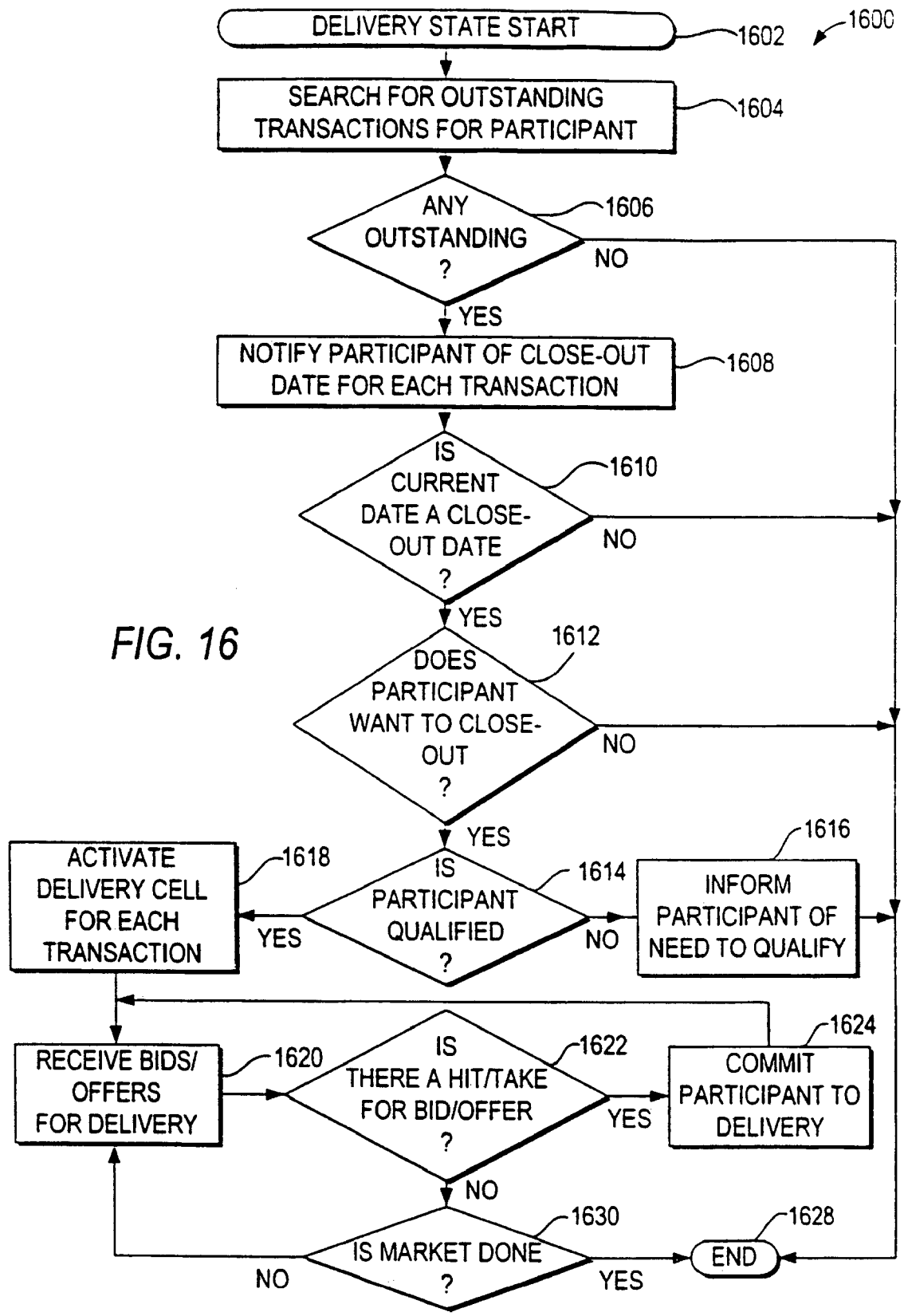
FIG. 16 is a flow diagram for a Delivery State in accordance with one embodiment of the present invention.
Figure 20:
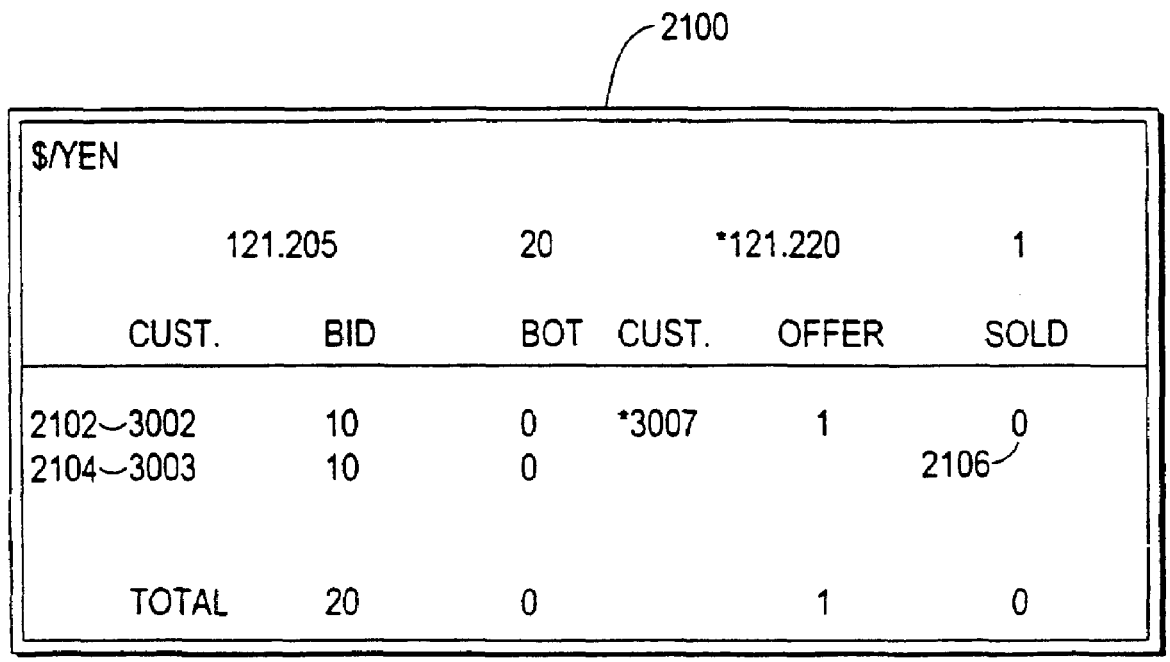

One embodiment of a Delivery State process 1600 in accordance with the present invention is illustrated in FIG. 16. The Delivery State is preferably initiated automatically after the Participant Qualification State has determined that the participant qualifies to trade (see FIG. 4, step 412), although the Delivery State could also be initiated by the participant from the Command State (see FIG. 3, state 330).

Once the Delivery State has begun at step 1602, process 1600 searches for outstanding transactions for the current participant at steps 1604 and 1606. If no transactions are outstanding, then process 1600 terminates at step 1628. Otherwise, if outstanding transactions are determined to exist at step 1606, then at step 1608, process 1600 notifies the participant of the close-out date for each transaction. Next, at step 1610, the process determines if the current date is a close-out date for one or more of the transactions. If not, then process 1600 terminates at step 1628. Otherwise, if the current date is determined to be a close-out date at step 1610, then the process asks the participant if it wants to close-out the transaction at step 1612. If not, then process 1600 terminates at step 1628.

However, if the participant does want to close out the transaction at step 1612, then process 1600 determines if the participant is qualified to close-out the transaction at step 1614. If the participant is not qualified, then process 1600 notifies the participant that it is not qualified at step 1616 and terminates at step 1628. Otherwise, if the participant is qualified, then process 1600 activates a delivery bid/offer cell for each transaction at step 1618. Next, process 1600 receives bids/offers for delivery of the transactions at step 1620. Then, at step 1622, the process determines if there was a hit/take from the participant for a bid/offer. If not, then process 1600 determines if the market is done for these transactions at step 1630, and, if so, terminates at step 1628. If the market is not done at step 1630, then the process loops back to step 1620 to receive more bids/offers.

If at step 1622 it is determined that there is a hit/take for a bid/offer, then, at step 1624, the process commits the participant that entered the bid/offer to settlement and delivery of the transactions, and then loops back to step 1620 to receive bids/offers for other transactions, if any.

One skilled in the art will appreciate that the present invention can be practiced by other than the described embodiments, which are presented for purposes of illustration and not of limitation, and the present invention is limited only by the claims which follow.

What is claimed is:

1. An apparatus comprising:
   at least one processor; and
   at least one memory device electronically coupled to the at least one processor, in which the at least one memory device stores control logic which, when executed by the at least one processor, directs the at least one processor to:
   receive on a first side of a market a first order and a second order, in which the first order comprises a first price and the second order comprises a second price;
   receive from a work station a trading command against at least a portion of the first side of the market, including at least a portion of the first order;
   prior to processing the trading command, cancel the first order, in which to cancel the first order causes the trading command to apply to at least the second order;
   determine an amount of time between a time the first order is canceled and a time of the trading command;
   determine that the amount of time is less than a predetermined value; and
   based at least in part on determining that the amount of time is less than the predetermined value, communicate to the work station that no trade has been completed.

2. The apparatus of claim 1, in which the control logic, when executed by the at least one processor, further directs the at least one processor to:
   determine that the amount of time is greater than the predetermined value; and
   execute the trading command against at least a portion of the second order at the second price based at least in part on determining that the amount of time is greater than the predetermined value.

3. The apparatus of claim 2,
   in which the first and second orders comprise at least one of:
   bids, and
   offers; and
   in which the trading command comprises at least one of:
   a hit command, and
   a lift command.

4. The apparatus of claim 2, in which the first and second prices differ.

5. The apparatus of claim 2, in which to cancel the first order comprises to cancel the first order based at least in part on receiving a command to cancel the first order.

6. The apparatus of claim 2, in which the time of the trading command comprises a time the trading command is placed.

7. The apparatus of claim 2, in which the time of the trading command comprises a time the trading command is processed.

8. An apparatus comprising:
   at least one processor; and
   at least one memory device electronically coupled to the at least one processor, in which the at least one memory device stores control logic which, when executed by the at least one processor, directs the at least one processor to:
   receive on a first side of a market a first order and a second order, in which the first order comprises a first price and the second order comprises a second price;
   receive from a work station a trading command against at least a portion of the first side of the market, including at least a portion of the first order;
   prior to processing the trading command, cancel the first order, in which to cancel the first order causes the trading command to apply to at least the second order;
   determine that a time at which the first order is canceled is within a predetermined time interval prior to a time of the trading command; and
   based at least in part on determining that the time at which the first order is canceled is within the predetermined time interval prior to the time of the trading command, communicate to the work station that no trade has been completed.

9. The apparatus of claim 8, in which the control logic, when executed by the at least one processor, further directs the at least one processor to:
   determine that the time at which the first order is canceled is outside the predetermined time interval prior to the time of the trading command; and
   execute the trading command against at least a portion of the second order at the second price based at least in part on determining that the time at which the first order is canceled is outside the predetermined time interval prior to the time of the trading command.

10. The apparatus of claim 9, in which the time of the trading command comprises a time the trading command is placed.

11. The apparatus of claim 9, in which the time of the trading command comprises a time the trading command is processed.

12. An apparatus comprising:
    at least one processor; and
    at least one memory device electronically coupled to the at least one processor, in which the at least one memory device stores control logic which, when executed by the at least one processor, directs the at least one processor to:
    receive on a first side of a market a first order and a second order, in which the first order comprises a first price and the second order comprises a second price;
    receive from a work station a trading command against at least a portion of the first side of the market, including at least a portion of the first order;

prior to processing the trading command, receive a command to cancel the first order, in which the command to cancel the first order causes the trading command to apply to at least the second order;
determine an amount of time between the trading command and the command to cancel the first order;
determine that the amount of time is less than a predetermined value; and
based at least in part on determining that the amount of time is less than the predetermined value, communicate to the work station that no trade has been completed.

13. The apparatus of claim 12, in which the control logic, when executed by the at least one processor, further directs the at least one processor to:
determine that the amount of time is greater than the predetermined value; and
execute the trading command against at least a portion of the second order at the second price based at least in part on determining that the amount of time is greater than the predetermined value.

14. An apparatus comprising:
at least one processor; and
at least one memory device electronically coupled to the at least one processor, in which the at least one memory device stores control logic which, when executed by the at least one processor, directs the at least one processor to:
receive on a first side of a market a first order and a second order, in which the first order comprises a first price and the second order comprises a second price;
receive from a work station a trading command against at least a portion of the first side of the market, including at least a portion of the first order;
prior to processing the trading command from the work station, execute a trade against the first order, in which to execute the trade against the first order causes the trading command from the work station to apply to at least the second order;
determine an amount of time between a time the trade is executed against the first order and a time of the trading command from the work station;
determine that the amount of time is less than a predetermined value; and
based at least in part on determining that the amount of time is less than the predetermined value, communicate to the work station that no trade has been completed.

15. The apparatus of claim 14, in which the control logic, when executed by the at least one processor, further directs the at least one processor to:
determine that the amount of time is greater than the predetermined value; and
execute the trading command from the work station against at least a portion of the second order at the second price based at least in part on determining that the amount of time is greater than the predetermined value.

16. The apparatus of claim 15,
in which the first and second orders comprise at least one of:
bids, and
offers; and
in which the trading command from the work station comprises at least one of:
a hit command, and
a lift command.

17. The apparatus of claim 15,
in which the first and second orders comprise bids; and
in which the second price is lower than the first price.

18. The apparatus of claim 15,
in which first and second orders comprise offers; and
in which the second price is higher than the first price.

19. The apparatus of claim 15, in which the time of the trading command from the work station comprises a time the trading command is placed.

20. The apparatus of claim 15, in which the time of the trading command from the work station comprises a time the trading command is processed.

21. An apparatus comprising:
at least one processor; and
at least one memory device electronically coupled to the at least one processor, in which the at least one memory device stores control logic which, when executed by the at least one processor, directs the at least one processor to:
receive on a first side of a market a first order and a second order, in which the first order comprises a first price and the second order comprises a second price;
receive from a work station a trading command against at least a portion of the first side of the market, including at least a portion of the first order;
prior to processing the trading command from the work station, execute a trade against the first order, in which to execute the trade against the first order causes the trading command from the work station to apply to at least the second order;
determine that a time at which the trade is executed against the first order is within a predetermined time interval prior to a time of the trading command from the work station; and
based at least in part on determining that the time at which the trade is executed against the first order is within the predetermined time interval prior to the time of the trading command, communicate to the work station that no trade has been completed.

22. The apparatus of claim 21, in which the control logic, when executed by the at least one processor, further directs the at least one processor to:
determine that the time at which the trade is executed against the first order is outside the predetermined time interval prior to the time of the trading command from the work station; and
execute the trading command from the work station against at least a portion of the second order at the second price based at least in part on determining that the time at which the trade is executed against the first order is outside the predetermined time interval prior to the time of the trading command.

23. The apparatus of claim 22, in which the time of the trading command from the work station comprises a time the trading command is placed.

24. The apparatus of claim 22, in which the time of the trading command from the work station comprises a time the trading command is processed.

25. An apparatus comprising:
at least one processor; and
at least one memory device electronically coupled to the at least one processor, in which the at least one memory device stores control logic which, when executed by the at least one processor, directs the at least one processor to:
receive on a first side of a market a first order and a second order, in which the first order comprises a first price and the second order comprises a second price;

receive from a first work station a trading command against at least a portion of the first side of the market, including at least a portion of the first order;

prior to processing the trading command from the first work station, receive from a second work station a trading command against at least the first order, in which the trading command from the second work station causes the trading command from the first work station to apply to at least the second order;

determine an amount of time between the trading command from the first work station and the trading command from the second work station;

determine that the amount of time is less than a predetermined value; and based at least in part on determining that the amount of time is less than the predetermined value, communicate to the first work station that no trade has been completed.

26. The apparatus of claim 25, in which the control logic, when executed by the at least one processor, further directs the at least one processor to:

determine that the amount of time is greater than the predetermined value; and execute the trading command from the first work station against at least a portion of the second order at the second price based at least in part on determining that the amount of time is greater than the predetermined value.

* * * * *